United States Patent
Khatri et al.

(10) Patent No.: US 11,005,336 B1
(45) Date of Patent: May 11, 2021

(54) MAGNETIC BEARING ASSEMBLY FOR ROTATING MACHINERY

(71) Applicant: Calnetix Technologies, LLC, Cerritos, CA (US)

(72) Inventors: Rasish Khatri, Cerritos, CA (US); Venky Krishnan, Los Alamitos, CA (US); John Stout, Long Beach, CA (US); Larry Hawkins, Manhattan Beach, CA (US)

(73) Assignee: Calnetix Technologies, LLC, Cerritos, CA (US)

( * ) Notice: Subject to any disclaimer, the term of this patent is extended or adjusted under 35 U.S.C. 154(b) by 0 days.

(21) Appl. No.: 16/860,953

(22) Filed: Apr. 28, 2020

(51) Int. Cl.
| | |
|---|---|
| *H02K 7/09* | (2006.01) |
| *F16C 32/04* | (2006.01) |
| *H02K 7/14* | (2006.01) |
| *H02K 11/21* | (2016.01) |
| *H02K 24/00* | (2006.01) |

(52) U.S. Cl.
CPC ............ *H02K 7/09* (2013.01); *F16C 32/0493* (2013.01); *H02K 7/14* (2013.01); *H02K 11/21* (2016.01); *H02K 24/00* (2013.01); *F16C 2380/26* (2013.01)

(58) Field of Classification Search
CPC . H02K 7/09; H02K 11/21; H02K 7/14; H02K 24/00; F16C 32/0493; F16C 2380/26
USPC ........................................................ 310/68 D
See application file for complete search history.

(56) References Cited

U.S. PATENT DOCUMENTS

| | | | |
|---|---|---|---|
| 6,965,181 B1 * | 11/2005 | Heshmat | F16C 17/024 310/90.5 |
| 8,796,894 B2 | 8/2014 | Filatov et al. | |
| 8,847,451 B2 | 9/2014 | Filatov et al. | |
| 10,227,860 B1 * | 3/2019 | McMullen | E21B 41/0085 |
| 10,584,533 B2 | 3/2020 | McMullen et al. | |
| 2013/0049507 A1 * | 2/2013 | Lang | F16C 32/0412 310/90.5 |
| 2013/0328455 A1 * | 12/2013 | Wu | F16C 32/0476 310/68 B |
| 2015/0275911 A1 * | 10/2015 | Carrasco | F04D 29/051 417/423.12 |
| 2016/0258506 A1 * | 9/2016 | Deane | F16C 32/044 |
| 2017/0298985 A1 * | 10/2017 | Brakensiek | D01H 4/14 |
| 2018/0128313 A1 * | 5/2018 | Sawicki | F16C 32/0444 |
| 2018/0311422 A1 | 11/2018 | Greatrex et al. | |
| 2020/0072030 A1 | 3/2020 | Filatov et al. | |

* cited by examiner

*Primary Examiner* — Alex W Mok
(74) *Attorney, Agent, or Firm* — Fish & Richardson P.C.

(57) ABSTRACT

A rotating machine includes a housing, a rotor shaft to rotate about a longitudinal axis, a position sensor to detect a position of the rotor shaft within the housing, and a magnetic bearing assembly coupled to the housing to support the rotor shaft within the housing. The magnetic bearing assembly includes an active magnetic bearing for active support of the rotor shaft, such as a thrust bearing actuator to produce an axial force component that is parallel to the central longitudinal axis and a radial force component that is orthogonal to the central longitudinal axis and axially offset from the thrust bearing actuator. The magnetic bearing assembly also includes a passive magnetic radial bearing to radially support the rotor shaft within the housing. A controller electrically coupled to the active magnetic bearing controls a control current to the active magnetic bearing.

22 Claims, 17 Drawing Sheets

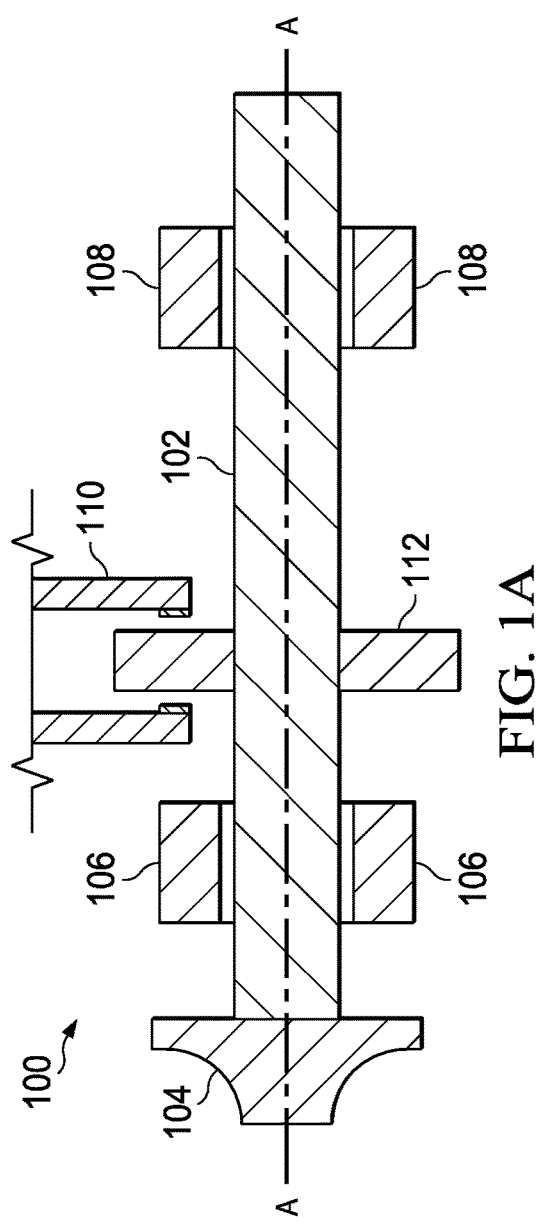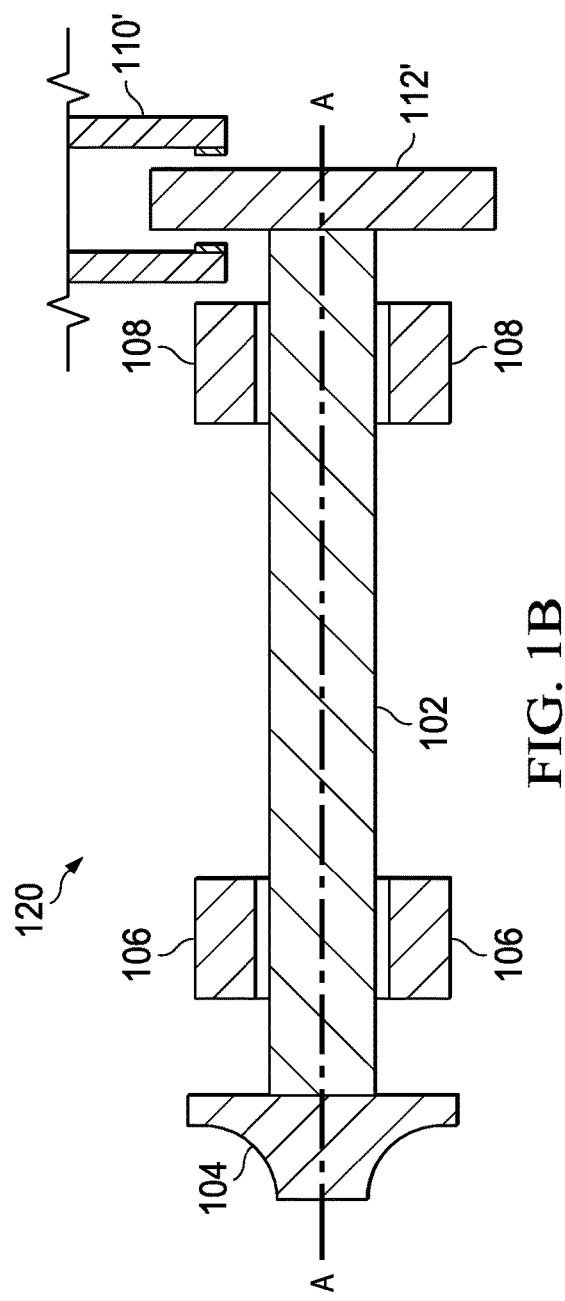

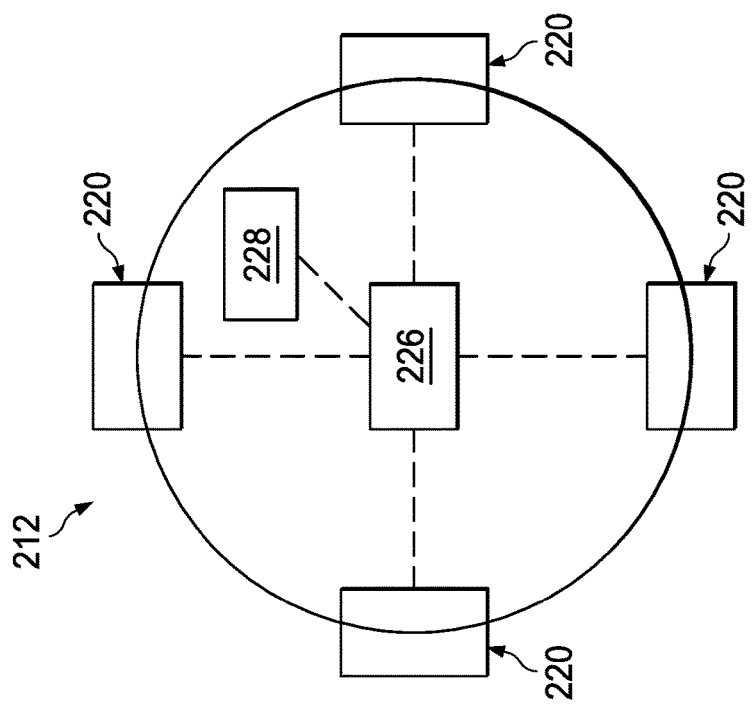
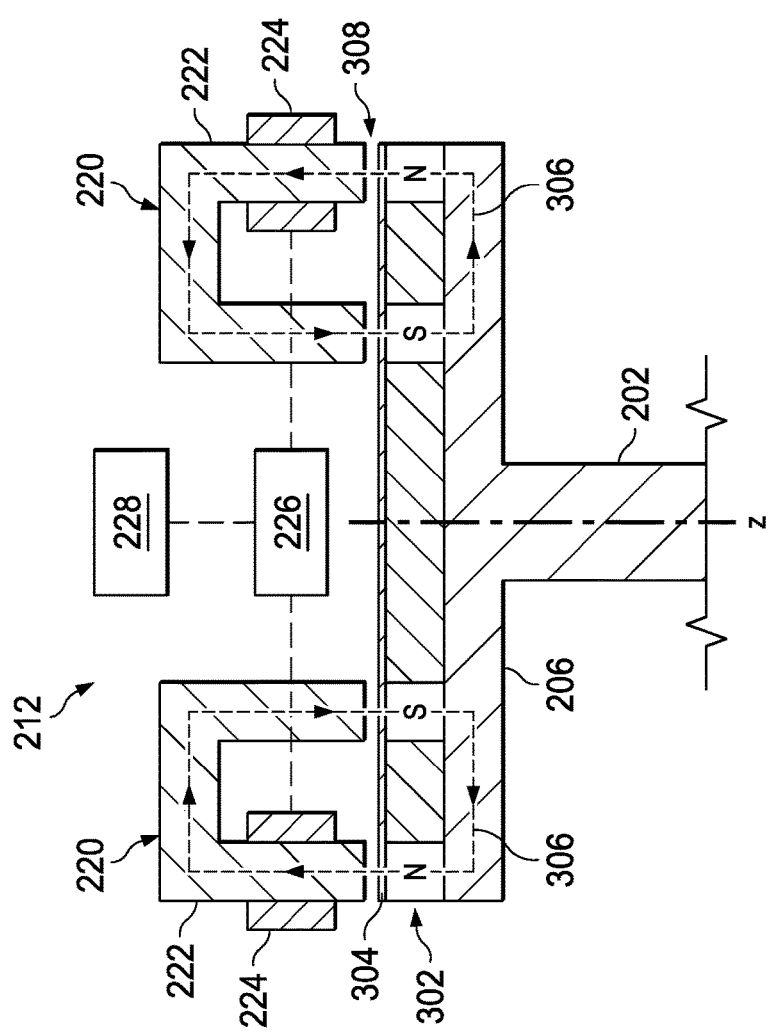
FIG. 5A
FIG. 5B

MAGNETIC BEARING ASSEMBLY FOR ROTATING MACHINERY

TECHNICAL FIELD

This disclosure relates to magnetic bearing assemblies for rotating equipment.

BACKGROUND

Magnetic bearings may be used to support or suspend objects using magnetic fields generated by permanent magnets and/or electromagnets. Magnetic bearing-supported machines are used in industrial applications, such as in blowers, in compressors, in heating, ventilation, and air conditioning (HVAC) systems, and in oil and gas applications. Industrial applications are generally cost-competitive, which makes it difficult for active magnetic bearing systems to compete with conventional bearing-supported technology. Also, rotating machinery in oil and gas applications often have significant envelope constraints that can make a magnetic bearing retrofit difficult to achieve.

SUMMARY

This disclosure describes rotating equipment with an active magnetic bearing component and a passive radial magnetic bearing component.

In some aspects, a magnetic bearing-supported rotating machine includes a housing, a rotor shaft to rotate about a central longitudinal axis within the housing, an impeller coupled to a longitudinal end of the rotor shaft, a position sensor to detect a position of the rotor shaft within the housing, and a magnetic bearing assembly coupled to the housing to support the rotor shaft within the housing. The magnetic bearing assembly includes an active magnetic bearing to actively support the rotor shaft, and includes a thrust bearing actuator. The active magnetic bearing produces an axial force component that is parallel to the central longitudinal axis and a radial force component that is orthogonal to the central longitudinal axis and axially offset from the thrust bearing actuator. The magnetic bearing assembly also includes a passive magnetic radial bearing to radially support the rotor shaft within the housing. A controller electrically coupled to the active magnetic bearing controls a control current to the active magnetic bearing.

This, and other aspects, can include one or more of the following features. The thrust bearing actuator can include at least three independently controllable thrust actuators circumferentially disposed about a thrust disk of the rotor shaft and configured to provide a resultant magnetic force on the thrust disk. The at least three independent controllable thrust actuators can be evenly distributed about a circumference of the thrust disk. The at least three independently controllable thrust actuators can include four independently controllable thrust actuators evenly disposed about a circumference of the thrust disk. The independently controllable thrust actuators can be single-sided actuators. The resultant magnetic force on the thrust disk can include at least one of the axial force component, a first rotational force component about a first radial axis, or a second rotational force component about a second radial axis orthogonal to the first radial axis. At least one of the first rotational force component or the second rotational force component produces the radial force component that is axially offset from the thrust bearing actuator. The controller can resolve for a position of the rotor shaft based at least partially on position data from the position sensor and direct corrective forces including the axial force component and the radial force component by the active magnetic bearing. The rotor shaft can be oriented vertically. The impeller can be formed in a compressor, blower, or fan. The active magnetic bearing can include a homopolar permanent magnet combination radial and thrust bearing, or a homopolar permanent magnet side-by-side combination bearing having a thrust bearing component adjacent to a radial bearing component. The active magnetic bearing can include an electromagnetic bias thrust actuator and a permanent magnet-bias homopolar radial magnetic bearing. The active magnetic bearing can include an electromagnetic bias thrust actuator and a heteropolar radial actuator. The rotating machine can include two passive magnetic radial bearings disposed about the rotor shaft.

Some aspects of the disclosure are encompassed by a method for supporting a rotor. The method includes supporting, with an active magnetic bearing and a passive magnetic radial bearing of a magnetic bearing assembly, a rotor shaft to rotate within a housing about a central longitudinal axis, and detecting a position of the rotor shaft within the housing. The method further includes controlling the active magnetic bearing to actively support the rotor shaft in response to the detected position of the rotor shaft, where the active magnetic bearing includes a thrust bearing actuator, and the active magnetic bearing produces an axial force component that is parallel to the central longitudinal axis and produces a radial force component that is orthogonal to the central longitudinal axis and axially offset from the thrust bearing actuator.

This, and other aspects, can include one or more of the following features. The thrust bearing actuator can include at least three single-sided thrust actuators circumferentially disposed about a thrust disk of the rotor shaft, and controlling the active magnetic bearing can include independently controlling axial forces of the at least three single-sided thrust actuators. The at least three single-sided thrust actuators can be separately controllable, and controlling axial forces of the at least three single-sided thrust actuators can include determining a resultant magnetic force on the thrust disk, the resultant magnetic force including at least one of the axial force component, a first rotational force component about a first radial axis, or a second rotational force component about a second radial axis orthogonal to the first radial axis, and controlling the at least three single-sided thrust actuators to apply the resultant magnetic force, where at least one of the first rotational force component or the second rotational force component produces the radial force component that is axially offset from the thrust bearing actuator. Controlling the active magnetic bearing to actively support the rotor shaft can include resolving for the detected position of the rotor shaft and directing corrective forces including the axial force component and the radial force component by the active magnetic bearing. The rotor shaft can be oriented vertically. Supporting the rotor shaft with the active magnetic bearing and a passive magnetic radial bearing can include radially supporting the rotor shaft with two passive magnetic radial bearings disposed about the rotor shaft.

In certain aspects, a magnetic bearing assembly includes an active magnetic bearing to actively support a rotor shaft in three degrees of freedom of the rotor shaft. The active magnetic bearing includes a thrust bearing actuator, produces an axial force component that is parallel to a central longitudinal axis of the rotor shaft, and produces a radial force component that is orthogonal to the central longitudinal axis and axially offset from the thrust bearing actuator.

The magnetic bearing assembly also includes a passive magnetic radial bearing to radially support the rotor shaft within a housing, and a controller electrically coupled to the active magnetic bearing to control a supply current to the active magnetic bearing.

This, and other aspects, can include one or more of the following features. The thrust bearing actuator can include at least three single-sided thrust actuators circumferentially disposed about a thrust disk of the rotor shaft, the at least three single-sided thrust actuators being separately controllable to provide a resultant magnetic force on the thrust disk. The resultant magnetic force on the thrust disk can include at least one of the axial force component, a first rotational force component about a first radial axis, or a second rotational force component about a second radial axis orthogonal to the first radial axis, where at least one of the first rotational force component or the second rotational force component produces the radial force component that is axially offset from the thrust bearing actuator.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

FIGS. 1A and 1B are schematic side views of a first conventional magnetic bearing-supported rotating machinery system and a second conventional magnetic bearing-supported rotating machinery system, respectively.

FIG. 5A is a partial schematic cross-sectional side view of an example thrust bearing, thrust disk 206, and rotor 202. FIG. 5B is a partial schematic top view of the example thrust bearing and thrust disk of FIG. 5A.

Like reference numbers and designations in the various drawings indicate like elements.

DETAILED DESCRIPTION

Figure 2:
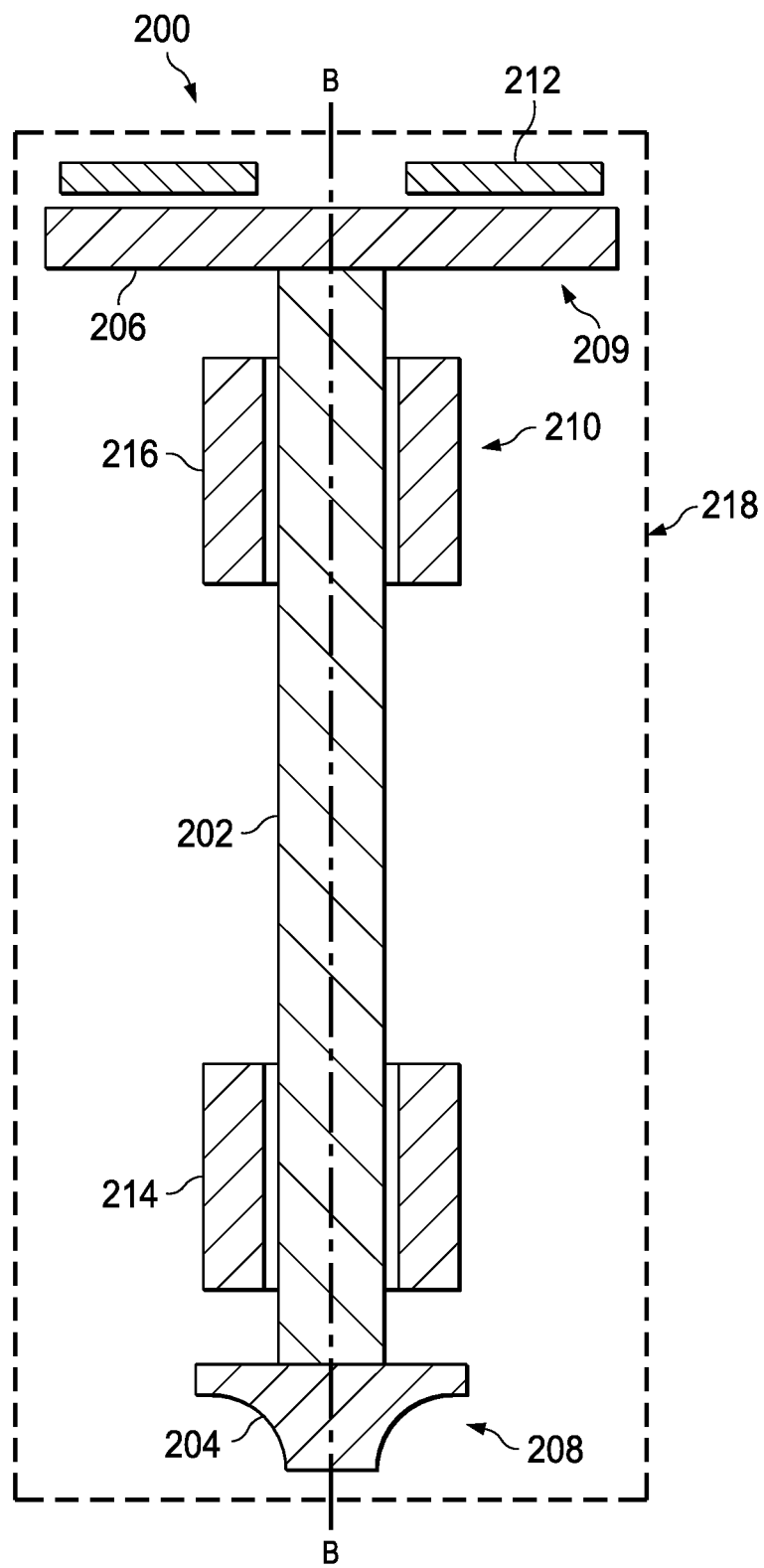
FIGS. 2 and 3 are schematic side views of example rotor systems including example magnetic bearing assemblies, including a single-sided thrust bearing.

This disclosure describes magnetic bearing systems, such as magnetic bearings in rotating machinery, including an active magnetic bearing component(s) (e.g., thrust actuator and/or radial actuator) that provides active control in three degrees of freedom of a rotor shaft, and at least one passive radial bearing that provides passive radial control (i.e., tilt control) of the rotor shaft. An active magnetic bearing system provides the active control of the rotor shaft with an active thrust bearing actuator, and in some instances, also an active radial bearing actuator component. The thrust bearing actuator of the active magnetic bearing system produces an axial force component on the rotor shaft, where the axial force component is parallel to a central longitudinal axis of the rotor shaft. The magnetic bearing system also produces a radial force component on the rotor shaft, where the radial force component is orthogonal to the central longitudinal axis and is axially (i.e., longitudinally) offset from the thrust bearing. The radial force component can be realized by an active radial bearing actuator that applies a radial force at a location separate from the thrust bearing actuator, or can be realized by the thrust bearing actuator generating a moment at the thrust actuator (e.g., a rotational force about a radial axis centered at the thrust bearing actuator) that results in a radial force component applied to the rotor shaft at an axial location separate from the thrust bearing.

In some instances, a thrust bearing includes multiple (e.g., three, four, or more) single-sided actuators positioned about a circumference of a thrust disk of the rotor, and the single-sided actuators control the rotor parallel to an axial axis (e.g., translation along the axial axis) and rotationally about two radial axes (e.g., rotational motion about the radial axes) that are orthogonal to the axial axis and each other. However, other active bearing types can be used to provide control in the three degrees of freedom, for example, in a first direction parallel to the axial axis and in two radial directions parallel to two principle radial axes, in combination with one or more passive bearings for additional stability of the rotor and/or redundancy in bearing support. The magnetic bearing system can be used in rotating machines, such as turbomachinery. The magnetic bearing system is implemented in rotating machines with a rotor shaft that is oriented vertically, such as in vertical compressors, fans, and blowers, and with a rotor shaft that is well-balanced, such that the radial loads due to shaft unbalance are minimal. The active bearing(s) provides active control of a rotor in the three orthogonal axes, and the one or more passive bearings provide passive bias (e.g., passive radial control), for example, for well-balanced rotating machinery with a vertically oriented rotor shaft.

A magnetic bearing system with an active thrust bearing and passive radial bearing(s) described here include advantages over conventional magnetic bearing systems. For example, the disclosed magnetic bearing system may include fewer active magnetic bearings than conventional magnetic bearing systems, in that the actuators of the thrust bearing are active and the radial bearing(s) is passive. This arrangement may reduce the diametrical envelope of rotating equipment with the magnetic bearing system, for example, since passive magnetic bearings can be diametrically smaller than active magnetic bearings. This arrangement may also reduce the number and size of electronics needed for the bearing assembly, and reduce a total power required to drive the magnetic bearings. The disclosed magnetic bearing system is less costly, for example, since passive magnetic bearings can be designed to be less expensive than active magnetic bearings. The magnetic bearing system is also less complex, thereby improving reliability of the system, since there are fewer active parts.

Developments in conventional magnetic bearing supported turbomachinery is often restricted by cost-competitiveness and envelope restrictions. A conventional magnetic bearing arrangement used in some example turbomachinery applications includes two active radial bearings to radially support a rotor, and one active axial bearing to axially support the rotor. FIGS. 1A and 1B are schematic side views of a first conventional magnetic bearing machinery system 100 and a second conventional magnetic bearing machinery system 120, respectively. The first conventional system 100 includes a rotor 102 and a driving element 104, such as a compressor, fan, or blower, with a longitudinal centerline A-A. A bearing system of the first system 100 includes a first active radial bearing 106, a second active radial bearing 108, and a thrust actuator 110 acting on a thrust disk 112 of the rotor 102. In the example first system 100 of FIG. 1A, the thrust disk is positioned between the first active radial bearing 106 and second active radial bearing 108. The example second system 120 of FIG. 1B is like the example first system 100 of FIG. 1A, except the thrust disk 112' is positioned at a longitudinal end of the rotor 102 such that the thrust actuator 110' is not between the first active radial bearing 106 and second active radial bearing 108. The thrust bearing 110 (and 110') can actuate in either longitudinal direction (i.e., axial direction) along the longitudinal length of the rotor 102, and has one degree of freedom (DOF), which is in that axial direction.

FIG. 2 is a schematic side view of an example rotor system 200 including an example magnetic bearing assembly 210. The rotor system 200 includes a rotor 202, or rotor shaft, that is substantially cylindrical and positioned along a central longitudinal axis B-B, a driving element 204 at a first longitudinal end 208 of the rotor 202, and a thrust disk 206 at a second longitudinal end 209 of the rotor 202 opposite the first end 208. The driving element 204 is connected to the rotor 202, and can take many forms. For example, the driving element 204 can include an impeller of a blower, compressor, fan wheel, or another element that drives the rotor 202 to rotate, such as a turbine, or is driven by rotation of the rotor 202 about longitudinal axis B-B. The impeller can be a two-way impeller, in that the impeller can be driven by rotation of the rotor, or the impeller can drive the rotor based on an environment (e.g., fluid flow) driving rotation of the rotor. The thrust disk, or rotor disk, is a disk-shaped cylindrical section of the rotor 202 with a greater diameter than adjacent sections of the rotor 202. Though FIG. 2 shows the thrust disk 206 as positioned at the second longitudinal end 209 of the rotor 202, the thrust disk 206 can be located at either longitudinal end of the rotor 202 or elsewhere along the rotor 202, such as at an intermediate location along the rotor 202 between the first longitudinal end 208 and the second longitudinal end 209.

The rotor system 200 also includes a housing 218 to house the rotor 202, thrust disk 206, magnetic bearing assembly 210, and in some instances, the driving element 204. The rotor shaft 202 rotates within the housing 218, and is supported in the housing 218 by the magnetic bearing assembly 210. Stator portions of the magnetic bearing assembly 210 are coupled to the housing 218, for example, to support and position the rotor 202 within the housing 218. During operation (e.g., rotation) of the rotor 202, a number of conditions (e.g., environment, ambient conditions, rotor imbalance or fault in the driving element 204, or other factors) can displace the rotor 202 off center, for example, relative to the housing 218 and/or longitudinal axis B-B. The magnetic bearing assembly 210 provides a restoring force to push the rotor 202 toward the center position. In the example rotor system 200 of FIG. 2, the magnetic bearing assembly 210 includes single-sided thrust actuators 212 to engage the thrust disk 206, a first radial bearing 214 about the rotor 202, and a second radial bearing 216 about the rotor 202. The first radial bearing 214 and second radial bearing 216 are each passive magnetic radial bearings positioned about the rotor to provide passive radial control (e.g., tilt control) of the rotor 202 in instances when the rotor 202 becomes radially offset from the central longitudinal axis B-B of the rotor system 100.

Figure 3:
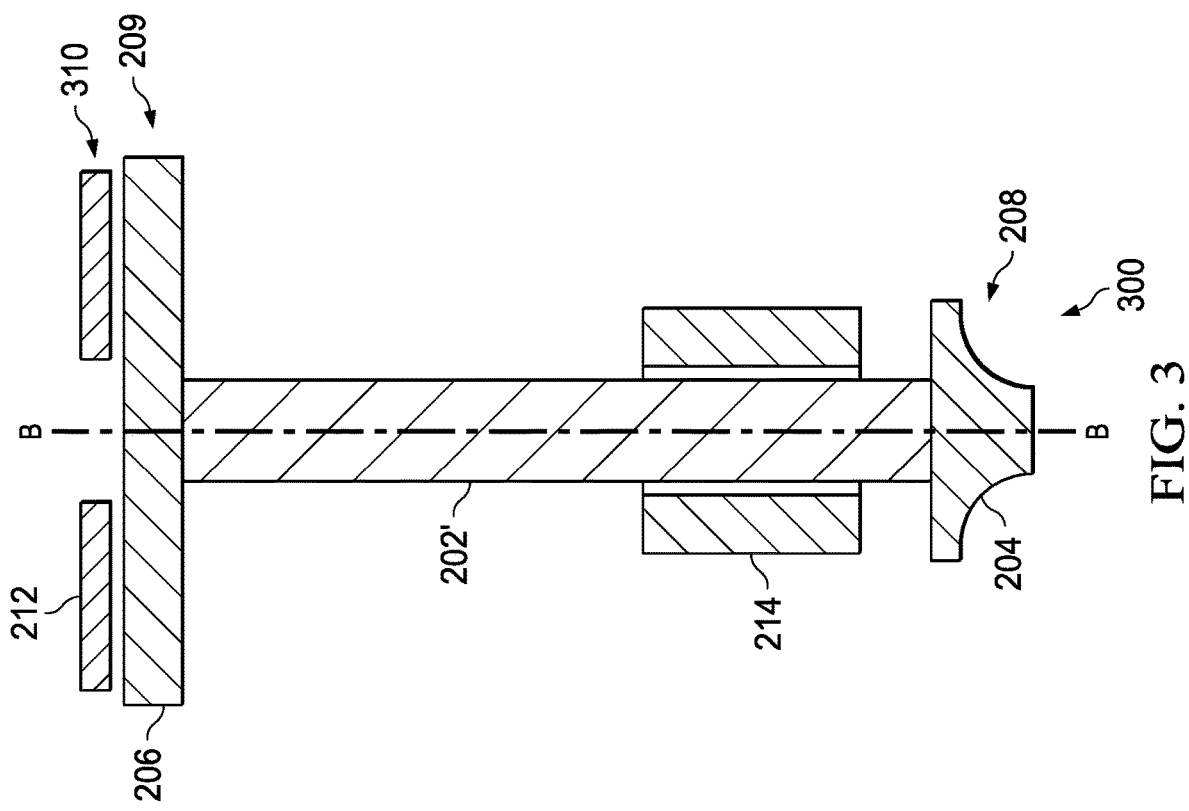

The example rotor system 200 is shown in FIG. 2 as including two passive magnetic radial bearings. However, the number of passive radial bearings can vary. For example, the rotor system can include only one passive radial bearing or more than two passive radial bearings, depending chiefly on the length of the rotor. FIG. 3 is a schematic side view of an example rotor system 300 with an example magnetic bearing assembly 310. The example rotor system 300 and example magnetic bearing system 310 is the same as the example rotor system 200 and example magnetic bearing assembly 210 of FIG. 2, except the rotor 202' is longitudinally shorter than the rotor 202 of FIG. 2, and the example magnetic bearing assembly 310 includes just one passive radial bearing (e.g., includes first radial bearing 214 and excludes the second radial bearing 216).

Figure 4:
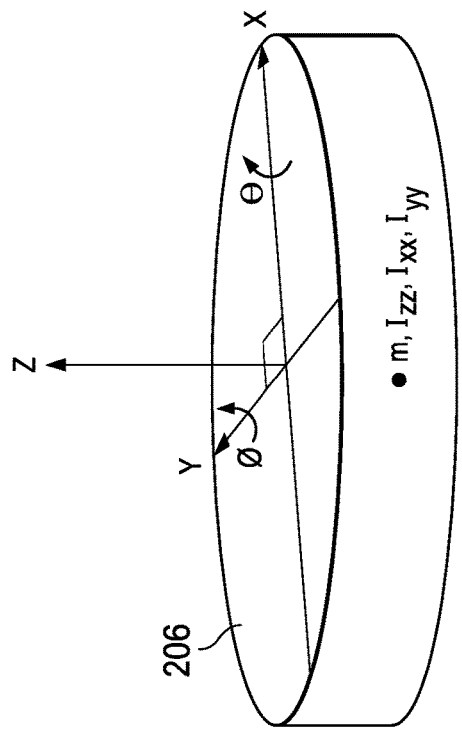
FIG. 4 is a perspective schematic partial view of a thrust disk of a rotor showing three independent axes.

The passive magnetic radial bearing(s) 214 and 216 provide passive radial control of the rotor 202, and the active actuators 212 provide active control of the rotor 202 in three independent axes, including in the longitudinal (axial) direction of the rotor 202. FIG. 4 is a perspective schematic partial view of the thrust disk 206 of the rotor 202 of FIGS. 2 and 3, and shows the three independent axes that the single-sided thrust actuator 212 controls the rotor 202 by. These three independent axes are the z-axis (coincident with longitudinal axis B-B of FIGS. 2 and 3 in the center position of the rotor shaft within the housing), the x-axis (with rotational control in the theta direction, $\theta$), and the y-axis (with rotational control in the phi direction, $\phi$). The magnetic thrust actuators 212 actively control the rotor 202 by applying magnetic forces on the thrust disk 206 in the z, $\theta$, and $\phi$ directions, for example, to align and orient the rotor 202 in a desired position in response to an disturbance force (e.g., offset, tilt, or other imbalance) in the rotor 202. In the example magnetic bearing system 310, the thrust bearing actuators 212 provide radial control of the rotor 202 by generating a moment at the thrust disk 206, where rotational forces on the thrust disk 206 in the $\theta$ and $\phi$ directions (i.e., rotational directions about the x-axis and y-axis) effectively result in a radial force parallel to the y-axis and x-axis at a location of the rotor shaft 202 that is axially separate from the thrust actuators 212 and thrust disk 206. In other words, the active rotational forces acting on the thrust disk 206 are realized as radial force components acting on the rotor shaft at a separate longitudinal location of the rotor shaft 202. For example, a rotational force in the $\theta$ direction about the x-axis (i.e., a moment force) is realized by a radial force vector on the rotor 202 that is parallel to the y-axis and at a longitudinally separate location than the thrust disk 206, such as an opposite longitudinal end of the rotor 202. Likewise, a rotational force in the φ direction about the y-axis (i.e., a moment force) is realized by a radial force vector on the rotor 202 that is parallel to the x-axis and at a longitudinally separate location than the thrust disk 206, such as an opposite longitudinal end of the rotor 202.

In some implementations, the thrust actuator includes three or more (e.g., three or four) single-sided magnetic actuators circumferentially positioned about the thrust disk on a longitudinal side of the thrust disk. FIG. 5A is a partial schematic cross-sectional side view of the example thrust bearing 212, thrust disk 206, and rotor 202. FIG. 5B is a partial schematic top view of the example thrust bearing 212 and thrust disk 206 of FIG. 5A. The example thrust actuator 212 includes four single-sided magnetic actuators 220 evenly spaced and circumferentially distributed about the thrust disk 206 of the rotor 202 (i.e., spaced apart at 90 degrees). Each single-sided actuator 220 includes a stator body 222 and a control coil 224, and engages with permanent magnets 302 positioned on the thrust disk 206 adjacent a stator body 222 of a respective actuator 220. The permanent magnets 302 are connected to the thrust disk 206, for example, with a magnet retention sleeve 304, are integral with the thrust disk 206, or are otherwise coupled to the thrust disk 206. A magnetic flux 306 generated by the permanent magnets 302 is directed axially through the air gap 308 between the permanent magnets 302 and the stator body 222 to provide an axial magnetic flux coupling of the thrust disk 206 to the thrust bearing 212. The actuators 220 of the thrust bearing 212 of the example magnetic bearing system 210 of FIGS. 2-5B are single-sided, so the magnetic flux 306 produces a force on the rotor in only one direction, for example, in the +z-direction. However, in some implementations, dual-sided thrust actuators 220 can be used to provide forces on the rotor in either direction along the z-axis.

Though the example thrust bearing 212 shown in FIGS. 5A and 5B has four single-sided magnetic actuators 220, the thrust bearing 212 can instead include three single-sided magnetic actuators 220 evenly spaced and circumferentially distributed (e.g., at 120 degrees offset from each other) about the thrust disk 206, or can include five or more actuators 220 distributed (evenly or unevenly) about the thrust disk 206. These actuators 220 can be separately controllable to provide the same or different axial forces parallel to the z-axis, and the distribution of these actuators 220 allows a resultant magnetic force on the thrust disk to have an axial force component the z-axis, a rotational force component about the x-axis, and/or a rotational force component about the y-axis, where the rotational force components are realized as radial force component(s) acting on the rotor 202 at an axial location separate from the thrust bearing 212.

The control coil 224 of each actuator 220 includes electromagnetic coils positioned on a pole of the stator body 222 to generate a controllable electromagnetic field. Each actuator 220 applies a force and controls the magnitude of the force on the thrust disk 206 at the position of the respective actuator 220. Each actuator 220 is separately controllable, and can impart a force on the thrust disk 206 that can be the same as or different than the forces imparted by the other of the actuators 220 at different respective locations on the thrust disk 206. Each actuator 220 (specifically, each control coil 224) is electrically and communicably coupled to a controller 226 and a power source 228. The controller 226 controls the actuators 220, providing signal instructions to the respective actuators 220 to impart a desired force on the thrust disk 206. The power source 228 provides a source of current to the control coils 224 of the actuators 220, and the controller 226 controls the combined force imparted on the thrust disk 206 by the actuators 220. Based on the distribution of forces imparted by the actuators 220 on the thrust disk 206, the thrust actuator 212 can provide active control to the rotor 202 in the z, θ, and/or φ directions, effectively providing both axial and radial control of the rotor 202. The controller 226 and power source 228 are shown schematically in FIGS. 5A and 5B, and can be positioned proximate to the actuators 220, in a location remote from the actuators 220, or another location relative to the actuators 220.

The actuators 220 actively control the axial position and rotor tilt of the rotor 202 by imparting a resultant magnetic force on the thrust disk 206. The controller 226 communicates with a position sensor or multiple position sensors located proximate to the rotor 202 to determine a position of the rotor 202 relative to the housing and magnetic bearing system, and the controller controls the actuators 220 to impart a resolved resultant force, for example, to pull the rotor 202 toward a centered position in instances it has been displaced off center. The position sensors are coupled to the housing, the magnetic bearing system 210, or both. In some instances, the position sensors are integral with or positioned adjacent to the actuators 220 to determine an axial position of the rotor 202 (via the position of the thrust disk 206) relative to the actuators 220. In some examples, the actuators 220 are the position sensors. The position sensors are communicably coupled to the controller 226, and detect movement of the thrust disk 206 and/or another part of the rotor 202 from its optimal, centered position in the x-y plane and axially from its centered position along the z-axis. When the position sensors detect an offset, they generate electrical signals received by the controller 226, which provides a command to the actuators 220 to impart a restoring force on the thrust disk 206 that biases the rotor 202 to reposition itself in its centered position. In operation of the rotor system 200, the controller 226 and single sided actuators 220 resolve for the position of the rotor 202 along the three directions (z, θ, and φ directions) of the rotor 202. For example, the controller 226 receives position sensor inputs from the position sensors, resolves the position sensor inputs into corrective forces on the rotor 202 in the z, θ, and φ directions, and provides corresponding signals to the actuators 220 to apply axial forces on the thrust disk 206 consistent with the corrective forces in the z, θ, and φ directions.

Figure 6A:
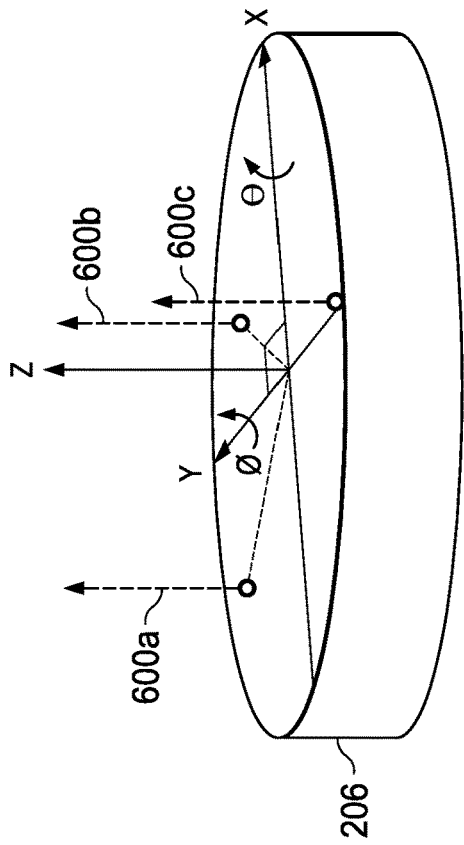
FIGS. 6A, 6B, 7A, and 7B are perspective schematic partial views of the thrust disk of FIG. 4, and show the three independent axes (x-axis, y-axis, and z-axis) and their respective three controlled directions (z, θ, and φ directions).
Figure 6B:
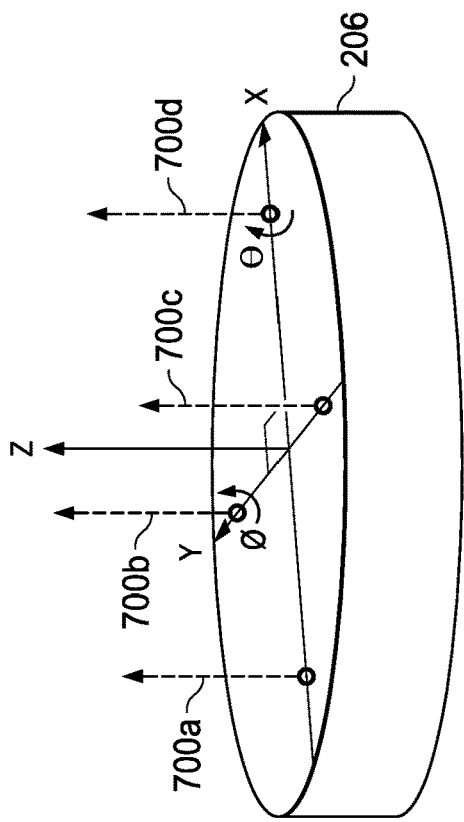
Figure 7A:
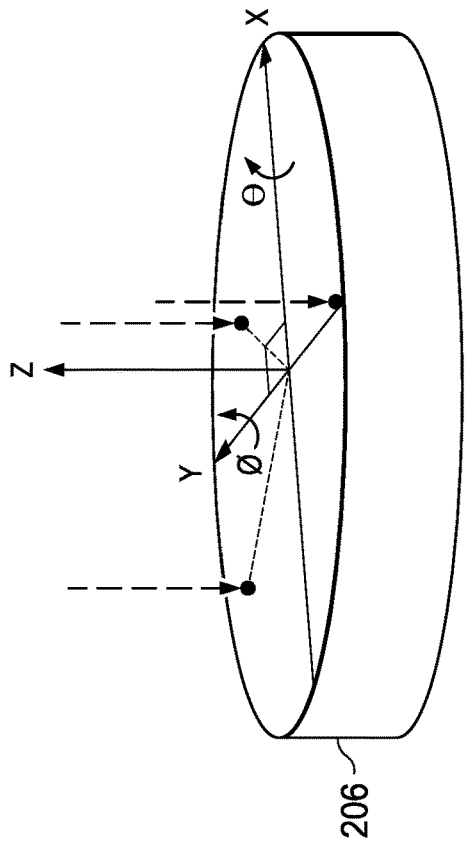
Figure 7B:
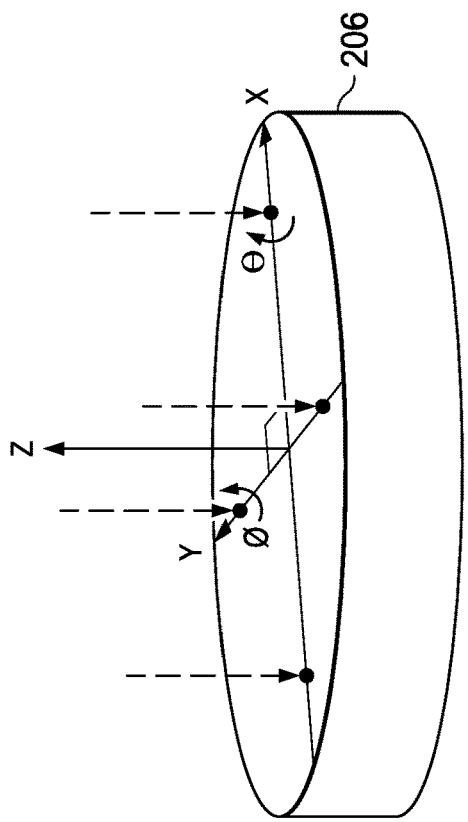

FIGS. 6A, 6B, 7A, and 7B are perspective schematic partial views of the thrust disk 206, the same thrust disk 206 of FIG. 4, and show the three independent axes (x-axis, y-axis, and z-axis) and their respective three controlled directions (z, θ, and φ directions) that the thrust actuator 212 controls. Further, FIGS. 6A and 6B schematically show the location and direction of example position sensor measurements from position sensors 600a, 600b, 600c, and FIGS. 7A and 7B schematically show the location and direction of example forces imparted by a thrust actuator. FIGS. 6A and 7A represent a bearing system with three single-sided actuators 220 and three position sensors, and FIGS. 6B and 7B represent a bearing system with four single-sided actuators 220 and four position sensors 700a, 700b, 700c, and 700d. With respect to FIGS. 6A and 6B, the position sensors measure the axial position of the thrust disk 206 in three or four different circumferential positions, and the controller 226 resolves these positions into the z, x, and y axes (i.e., the z, θ, and φ directions). With respect to FIGS. 7A and 7B, the actuators 220 apply an axial force at three or four different circumferential positions of the thrust disk 206 to independently control the perceived motion of the thrust disk 206 (and thereby, the rotor 202) in the z, θ, and ϕ directions.

The locations of the position sensors can vary. For example, the position sensors can be positioned relative to the thrust disk 206 on the same longitudinal side of the thrust disk 206 as the actuators 220, on the opposite longitudinal side of the thrust disk 206 as the actuators 220, positioned adjacent a different thrust disk of the rotor, or positioned elsewhere on the rotor, to measure the relative position of the rotor relative to its housing.

FIGS. 6A and 6B show examples with three or four axial position sensors positioned to measure the axial position of certain locations of the thrust disk 206 relative to the housing. In some instances, position sensors can reside (instead of or in addition to the position sensors of FIGS. 6A and 6B) about the rotor 202, such as proximate to the passive radial bearings, and are coupled to the housing, the magnetic bearing system 210, or both. For example, position sensors can include an x-axis position sensor, a y-axis position sensor, and a z-axis position sensor, which sense x-axis, y-axis, and z-axis displacement of the rotor 202 relative to the housing and magnetic bearing assembly 210. The sensors detect movement of the rotor 202 radially from its optimal, centered position in the x-y plane, and axially from its centered position along the z-axis, relative to the housing. When the position sensors detect an offset of the rotor 202, they generate electrical signals received by a controller, which provides a command to the actuators 220 to impart a restoring force on the thrust disk 206 that biases the rotor 202 to reposition itself in its centered position. In operation of the rotor system 200, the single sided actuators 220 resolve for the position of the rotor 202 and forces on the rotor 202 along the three directions (z, θ, and ϕ directions) of the rotor 202.

Figure 8:
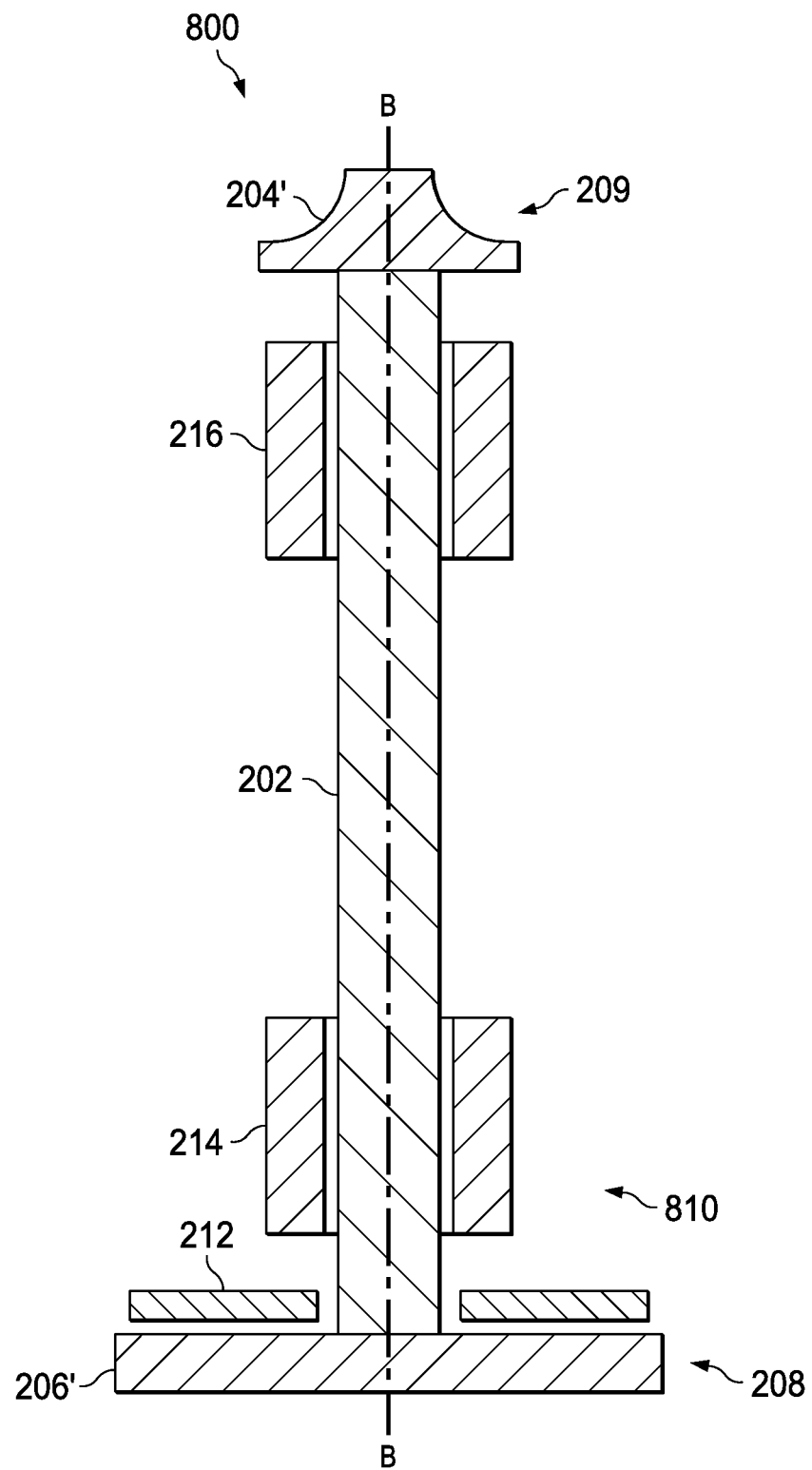
FIG. 8 is a schematic side view of an example rotor system including an example magnetic bearing assembly.

In some instances, such as shown in FIGS. 2 and 3, the rotor system 100 of a rotating machinery is oriented such that the longitudinal axis of the rotor 202 is vertical. In a well-balanced rotating machine, the expected radial loads on the passive magnetic bearing(s) are minimal, for example, since forces applied by or applied to the driving element 204 are primarily (substantially or completely) along the z-axis. The expected radial loading for vertical machines is primarily due to shaft unbalance. Since shaft unbalance increases with the square of the shaft spin speed, and increases proportionally with the quantity of distributed rotor unbalance, a vertical machine that runs at low speeds or is well-balanced will not be subject to large radial loads due to unbalance. An example of a well-balanced machine could be a 20 krpm (kilo revolutions per minute) spin speed compressor that is balanced to ISO 1940 G0.7, generally considered a tight balance grade for high-speed compressors. In some examples, the actuators 220 of the thrust bearing 210 (or 310) are offset in the magnetic bearing air gap, for example, to take advantage of the negative stiffness force of the active magnetic bearings, which can be used to offset some or all of the weight of the rotor shaft and minimize thrust load required from the thrust bearing. In some other examples, the driving element (e.g., blower, compressor, fan wheel) can be positioned at a vertical top of the rotating machinery, and the static thrust load from the driving element can be used to offset the rotor weight. For example, FIG. 8 is a schematic side view of an example rotor system 800 including an example magnetic bearing assembly 810. The rotor system 800 and magnetic bearing assembly 810 are the same as the rotor system 200 and magnetic bearing assembly 210 of FIG. 2, except the rotor system 800 is vertically flipped in that the driving element 204' is oriented at a vertical top of the rotor 202, and the thrust disk 206' is oriented at a vertical bottom of the rotor. The thrust bearing of the example magnetic bearing system 810 is positioned on the same (upper) side of the thrust disk 206' as the rotor shaft 202. In the example rotor system 800 of FIG. 8, the direction of the aerodynamic load acts in the opposite direction as gravity, which can be advantageous for load reduction on the actuators of the magnetic bearing system 810.

As described earlier and with respect to FIGS. 2 and 3, the magnetic bearing system 210 includes one or more passive magnetic radial bearings positioned about the rotor 202. Two or more passive radial bearings can be included for longer rotors (e.g., rotor 202 of FIG. 2), and multiple radial bearings can provide tilt control of the rotor in addition to radial control of the rotor. For shorter rotors (e.g., rotor 202' of FIG. 3), the magnetic bearing assembly can include only one passive radial bearing, though more than one can be implemented, for example, for redundancy or additional control.

Figure 9:
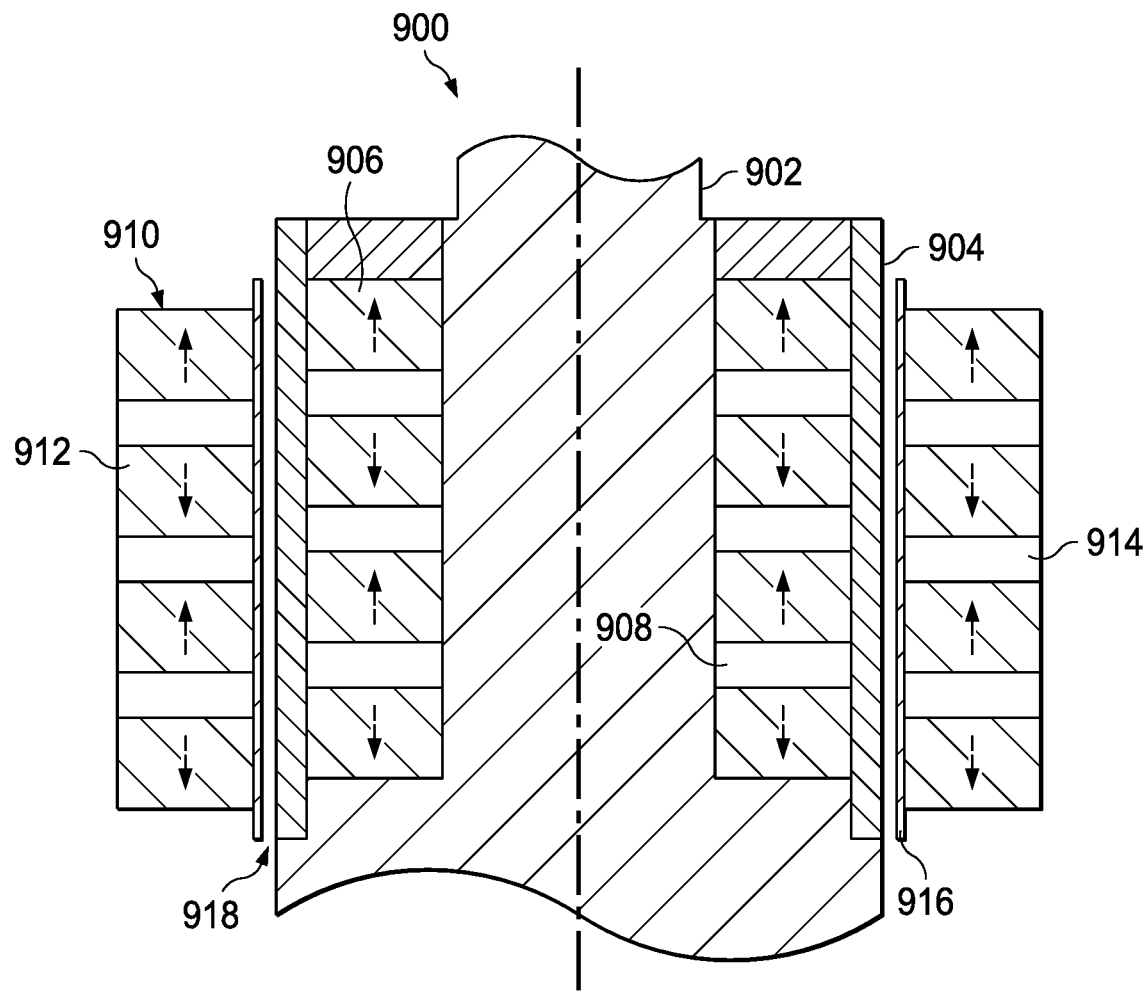
FIG. 9 is a partial cross-sectional side view of an example passive radial bearing that can be used as a passive radial bearing in the magnetic bearing assembly of FIG. 2, the magnetic bearing assembly of FIG. 3, or the magnetic bearing assembly of FIG. 8.

FIG. 9 is a partial cross-sectional side view of an example passive radial bearing 900 that can be used as a passive radial bearing in the magnetic bearing assembly 210 of FIG. 2, the magnetic bearing assembly 310 of FIG. 3, or the magnetic bearing assembly 810 of FIG. 8. The example radial bearing 900 is positioned about a shaft 902 (e.g., rotor shaft 202 or 202') that is substantially cylindrical and non-magnetic. A rotor sleeve 904 on a radially exterior surface of the shaft 902 encloses rotor magnets 906 onto the shaft 902. The rotor magnets 906 are coupled to or integrally formed with the shaft 902, and are separated by non-magnetic interlayers 908. In some instances, the interlayers 908 are non-conductive. The radial bearing 900 also includes a stator 910 that includes multiple stator magnets 912 in a stacked orientation, with non-magnetic interlayers 914 positioned between adjacent stator magnets 912. In some instances, the stator 910 includes a stator sleeve 916 on a radially inner side of the stator 910 between the stator 910 and the rotor magnets 906. The stator sleeve 916 can be formed of a non-magnetic material. The stator 910 is radially offset from the rotor magnets 906 to provide an air gap 918 between the stator 910 and the rotor magnets 906.

While FIGS. 2, 3, 5A, 5B, and 8 show an active bearing with single-sided actuators to provide control of a rotor shaft (e.g., rotor 202 or rotor 202') in the z, θ, and ϕ directions, other active magnetic bearings can be implemented to control the rotor in three degrees of freedom, including in the z direction (or parallel to the z axis), θ direction, ϕ direction, x direction (or parallel to the x axis), y direction (or parallel to the y axis), or combinations of these directions. For example, a magnetic bearing system with different active actuator types can be implemented in example rotor systems 200, 300, and/or 800 to provide active control of the rotor in the three degrees of freedom.

Figure 10A:
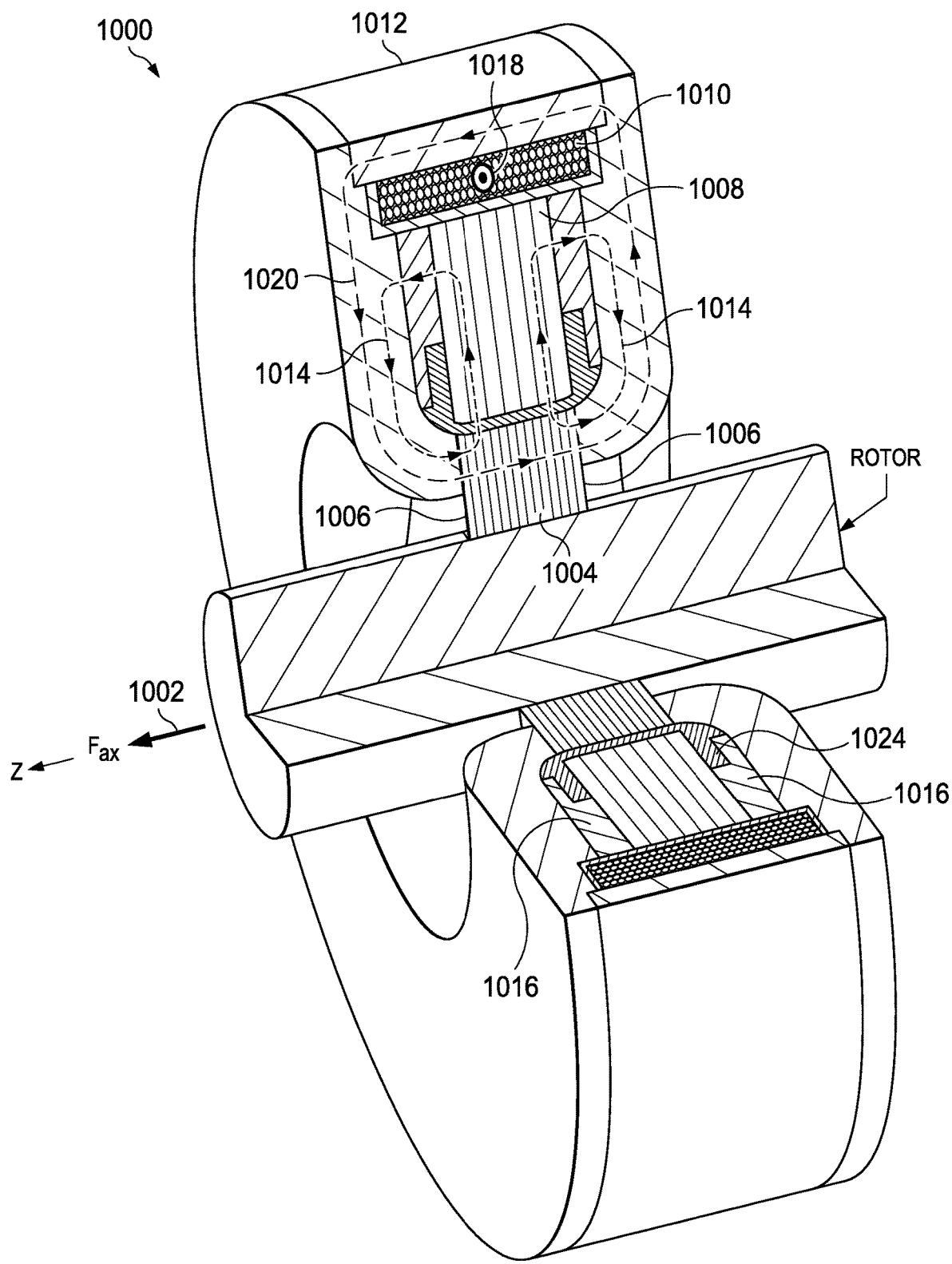
FIGS. 10A and 10B are a perspective partial cutaway view and a schematic cross-sectional top view, respectively, of an example homopolar permanent-magnet-biased actuator.
Figure 10B:
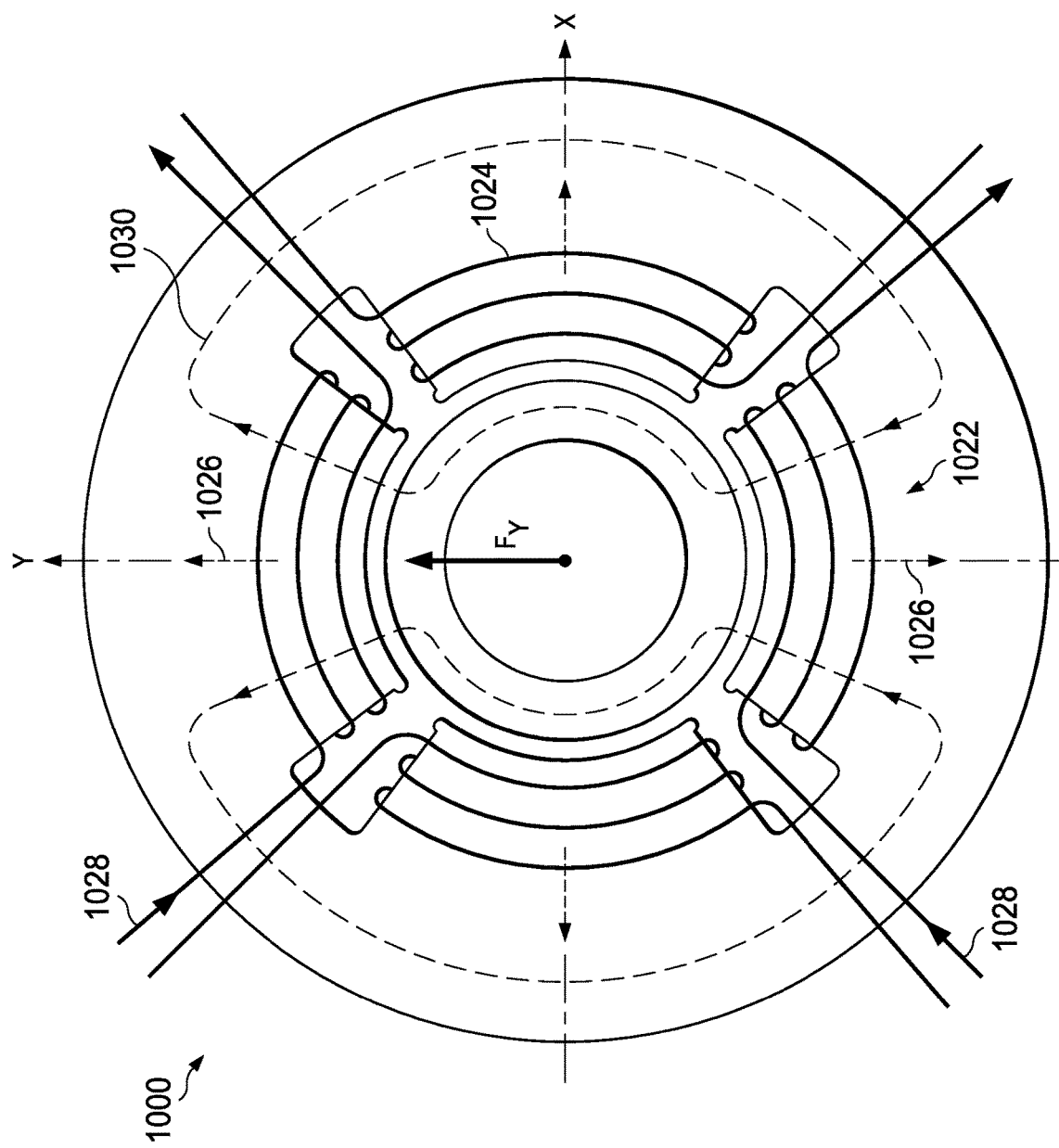

FIGS. 10A and 10B are a perspective partial cutaway view and a schematic cross-sectional top view, respectively, of an example homopolar permanent-magnet-biased actuator 1000 that can be used to provide active control of a rotor in the three degrees of freedom, and can be used in combination with one, two, or more passive radial bearings. The example homopolar permanent-magnet-biased actuator 1000 of FIGS. 10A and 10B can generate an axial force 1002 parallel to the z-axis, and can provide radial forces on the same actuator target 1004 (e.g., rotor disk or thrust disk) in directions parallel to the x-axis and parallel to the y-axis.

The example actuator 1000 includes axial poles 1006 oriented toward the target 1004, a radial pole assembly 1008 between the axial poles 1006, an axial control coil 1010 radially outward of the radial pole assembly 1008, and can further include an axial backiron 1012. A bias magnetic flux 1014 is generated by permanent magnets 1016 and directed by the axial poles 1006 to an axial gap between the axial poles 1006 and the target 1004. The axial control coil 1010 carries a controlled current 1018 around the actuator axis, which produces the magnetic axial control flux 1020. The magnitude and direction of the axial control flux 1020 is dependent on the current 1018 through the coil 1010, which can be controlled by a controller (e.g., controller 226). This axial control coil 1010 provides active control of the target 1004 in the z-axis. FIG. 10B also illustrates radial forces on the target 1004 provided by the actuator 1000. At least three radial control poles 1022 (four shown), each wound with a radial control winding 1024, generate radial bias fluxes 1026. Energizing the radial control coils 1024 with radial control current 1028 produce radial control flux 1030, which can produce a controlled radial force on the target 1004 (e.g., a force in a desired direction in the x-y plane).

Figure 11A:
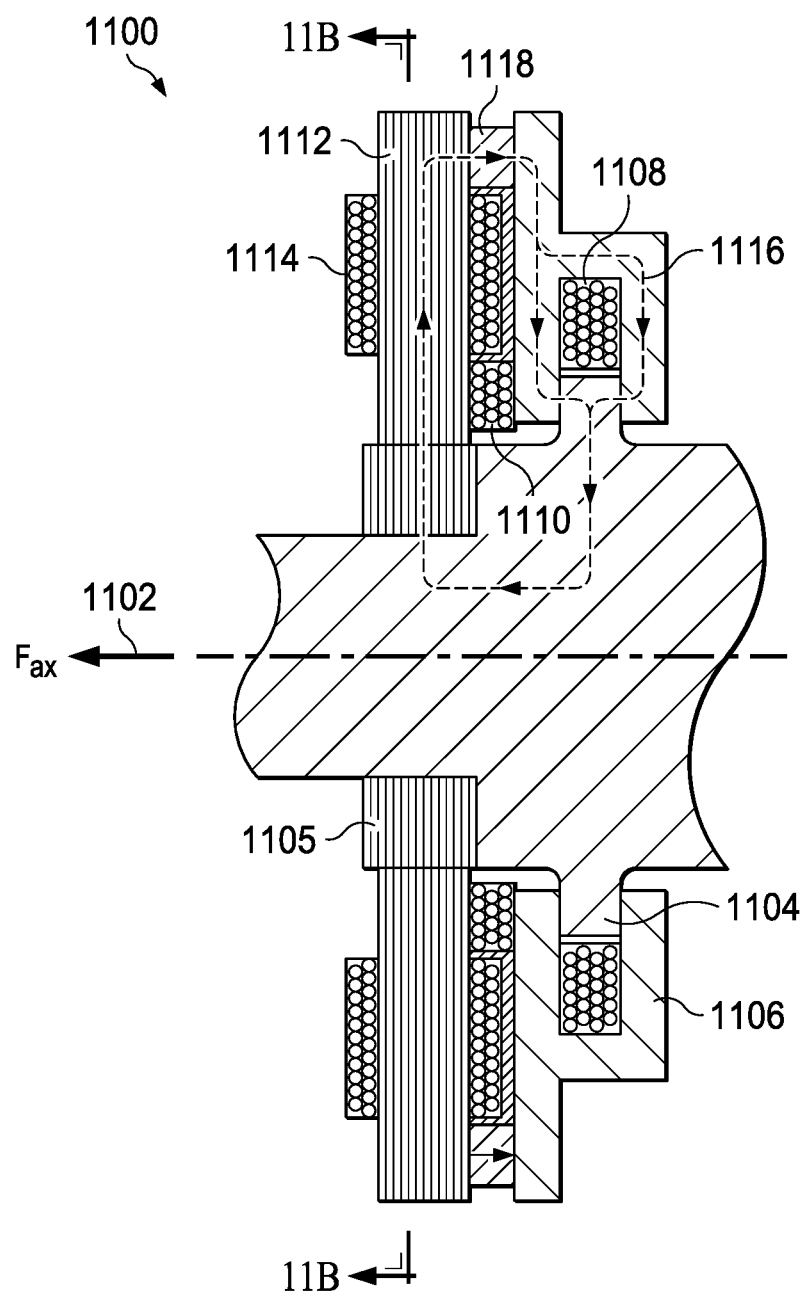
FIGS. 11A and 11B are a partial cross-sectional side view and a schematic cross-sectional top view, respectively, of an example permanent magnet-bias homopolar side-by-side (SBS) bearing.
Figure 11B:
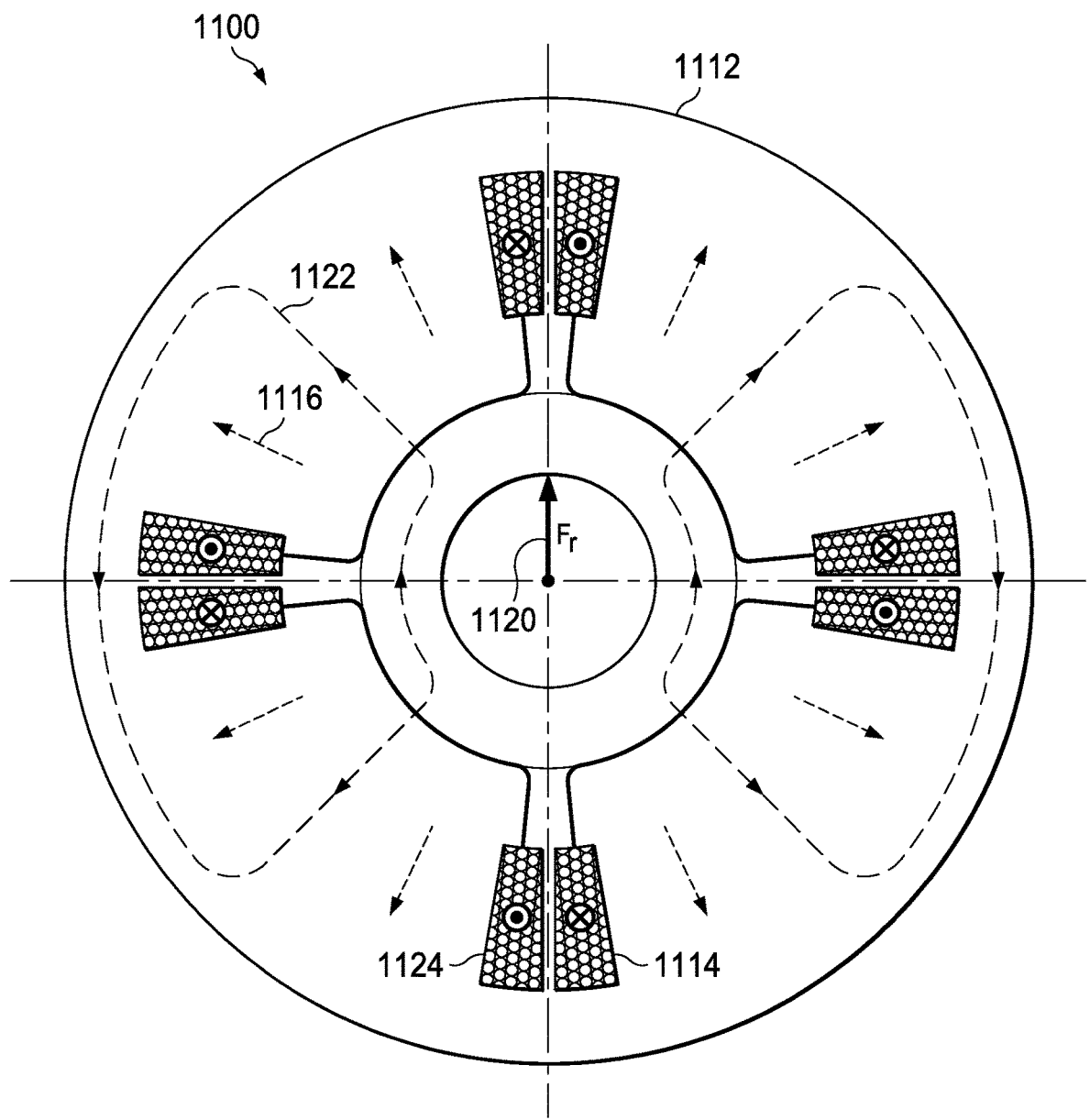

FIGS. 11A and 11B are a partial cross-sectional side view and a schematic cross-sectional top view, respectively, of an example permanent magnet-bias homopolar side-by-side (SBS) bearing 1100. The example homopolar SBS bearing 1100 can be used to provide active control of a rotor in the three directions, and can be used in combination with one, two, or more passive radial bearings. The example homopolar SBS bearing 1100 of FIGS. 11A and 11B can generate an axial force 1102 parallel to the z-axis on an axial actuator target 1104 (e.g., rotor disk or thrust disk), and can provide radial forces on a radial actuator target 1105 (e.g., a different rotor disk or thrust disk) in directions parallel to the x-axis and parallel to the y-axis. In some instances, the axial actuator target 1104 is non-laminated, and the radial actuator target 1105 is laminated. The example actuator 1100 includes axial poles 1106 oriented toward the axial target 1104, an axial control coil 1108 between the axial poles 1106, and an axial compensation coil 1110. A laminated actuator stator 1112 resides adjacent the radial actuator target 1105, and radial control coils 1114 are wound around the actuator stator 1112. A bias flux 1116, illustrated in FIG. 11A, is generated by permanent magnet 1118. FIG. 11B also illustrates a radial force 1120 on the radial target 1105 provided by the control flux 1122. Energizing the radial control coils 1114 with radial control current 1124 produces and controls the control flux 1122 to produce a controlled radial force on the target 1105 (e.g., a force in a desired direction in the x-y plane).

Figure 12:
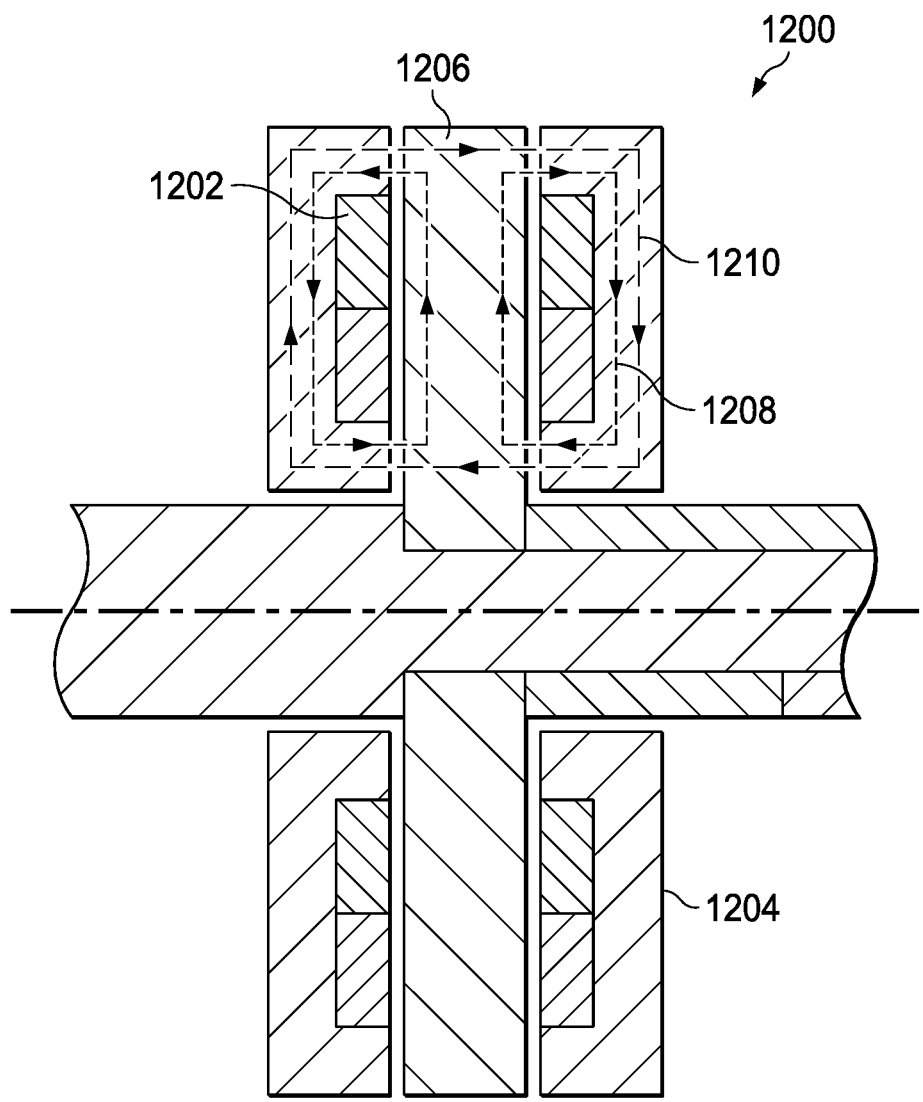
FIG. 12 is a schematic side view of an example electromagnetic-bias thrust actuator.
Figure 13A:
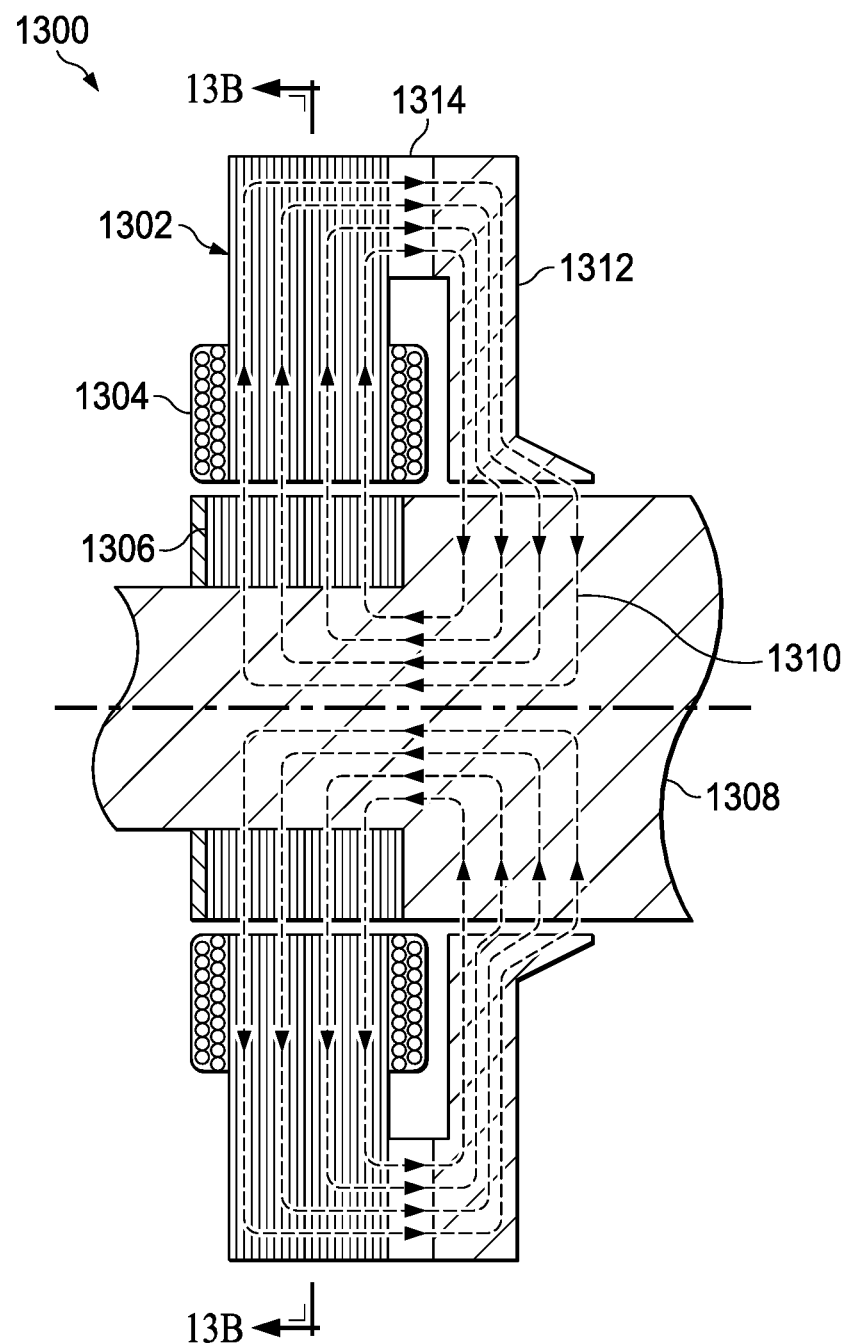
FIGS. 13A and 13B are a partial cross-sectional side view and a schematic cross-sectional top view, respectively, of an example permanent magnet-bias homopolar radial bearing.
Figure 13B:
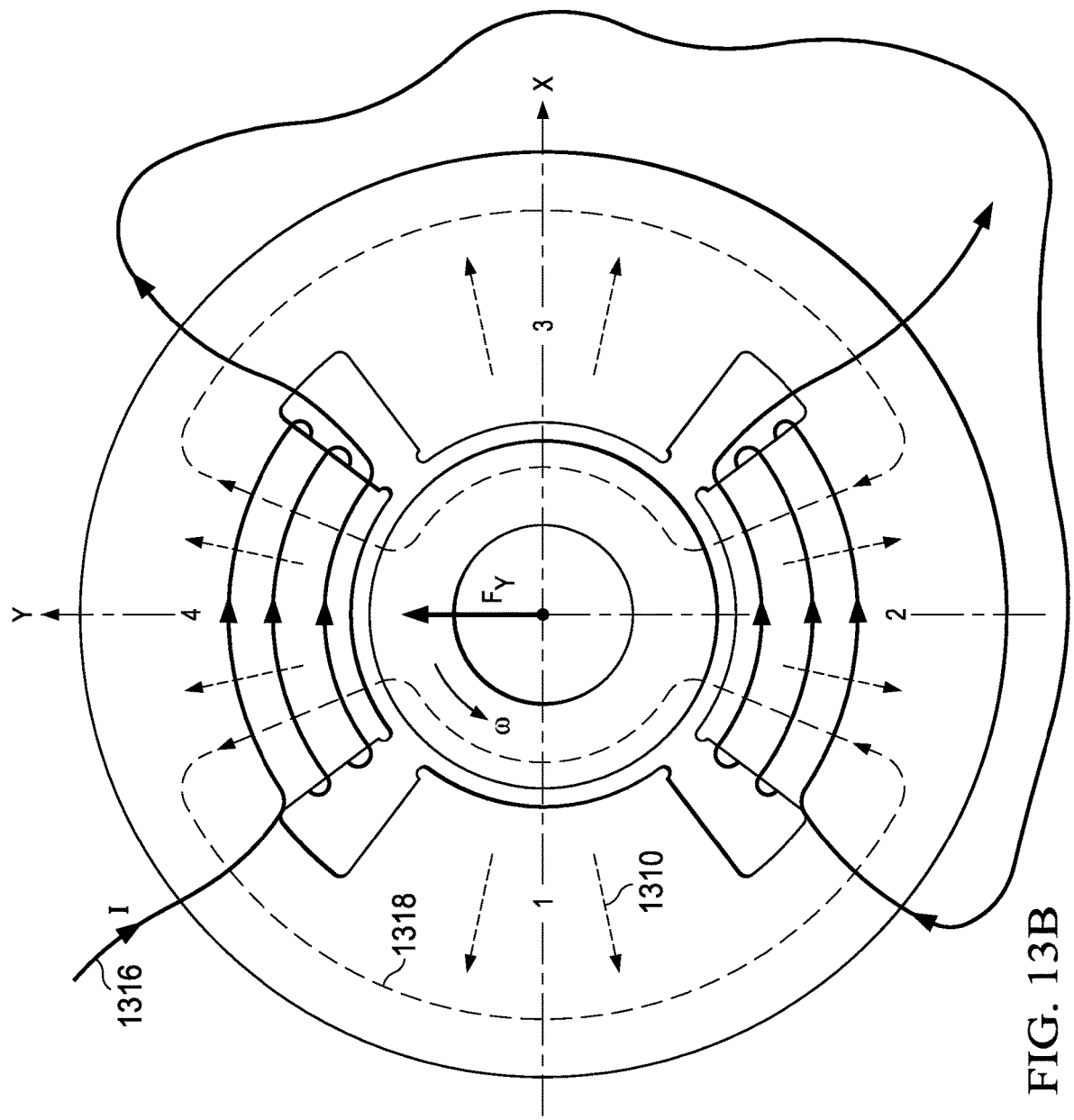
Figure 14A:
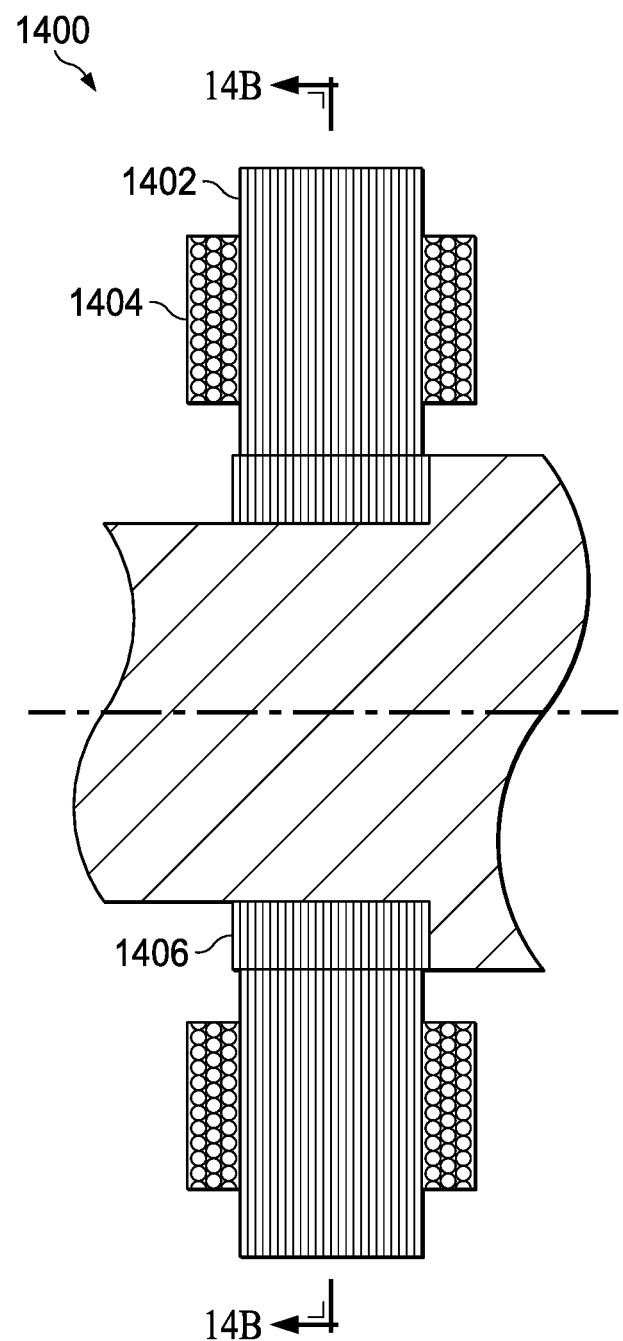
FIGS. 14A and 14B are a partial cross-sectional side view and a schematic cross-sectional top view, respectively, of an example heteropolar radial actuator.
Figure 14B:
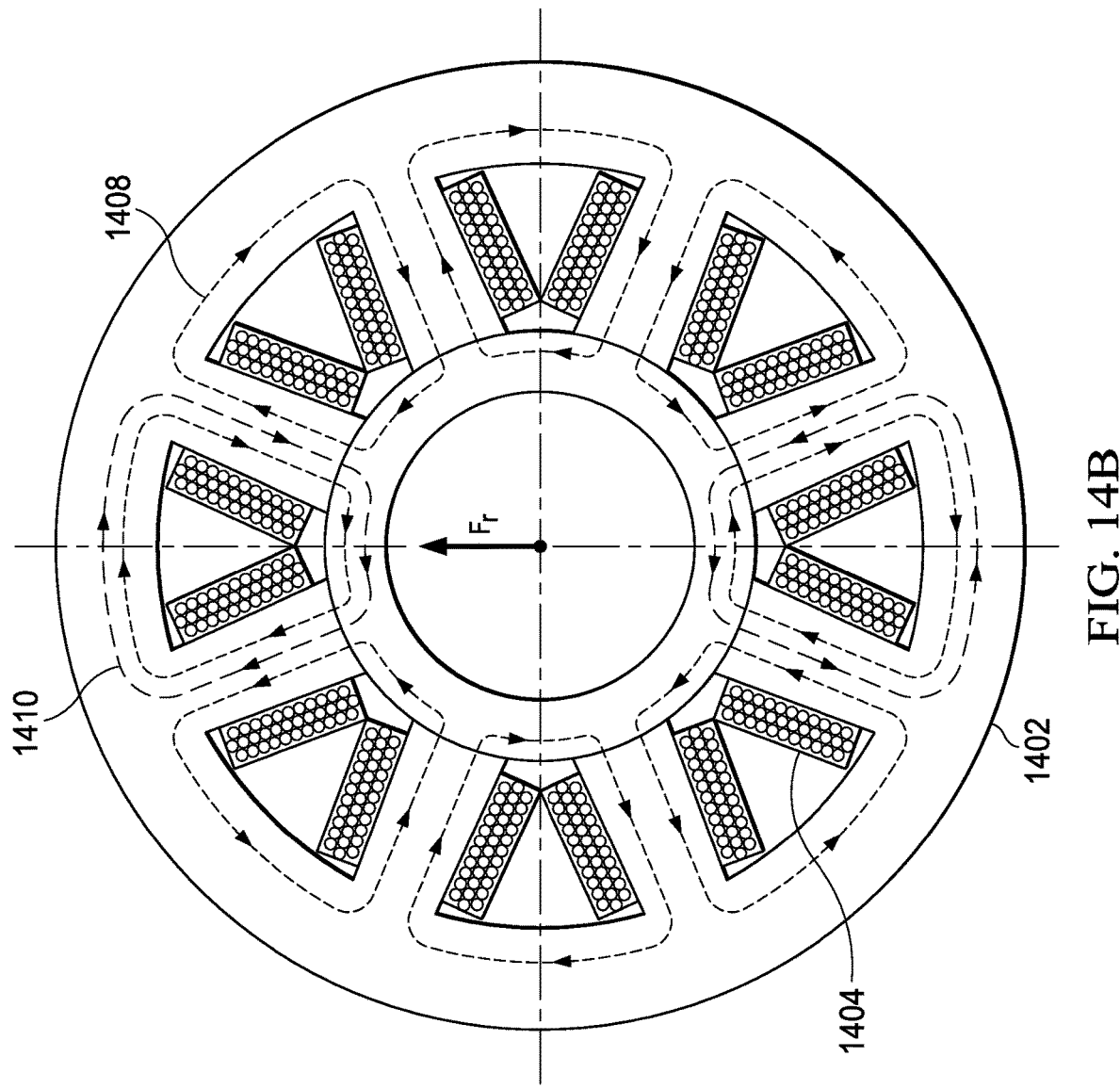

In some implementations, a magnetic bearing assembly can include a separate active radial bearing with a separate active thrust bearing to provide active control of a rotor in the three degrees of freedom. For example, FIG. 12 is a schematic side view of an example electromagnetic-bias thrust actuator 1200 that can be used to provide active control of the rotor in the axial direction (e.g., parallel to the z-axis), and can be used in combination with an active radial bearing and one or more passive radial bearings. Electromagnetic coils 1202 wrapped around a stator 1204 and oriented about a rotor pole 1206 provide a bias flux 1208 as illustrated and provide a control flux 1210 that provides a controlled axial force on the rotor pole 1206, and thereby, the central rotor shaft. In addition, FIGS. 13A and 13B are a partial cross-sectional side view and a schematic cross-sectional top view, respectively, of an example permanent magnet-bias homopolar radial bearing 1300 that can provide active control of a rotor in a first radial direction parallel to the x-axis and a second radial direction parallel to the y-axis, resulting in radial forces acting on the rotor shaft in a location separate from a thrust bearing actuator (e.g., the example thrust actuator 1200 of FIG. 12). The example radial bearing 1300 can be used in combination with other active and/or passive bearings. For example, a magnetic bearing system for control of a rotor in three degrees of freedom, or the three directions, can include one of the example radial bearing 1300 to actively control the rotor in one or two radial directions, one of the example electromagnetic-bias thrust actuator 1200 to actively control the rotor in the axial direction, and one or more passive bearings. The example radial bearing 1300 of FIGS. 13A and 13B includes a radial pole assembly 1302 and radial control windings 1304 generally around a laminated actuator target 1306 on a rotor shaft 1308 (e.g., a soft-magnetic steel shaft), where a bias flux 1310 is directed along the actuator target 1306, the radial pole assembly 1302, a bias magnet 1312, a dead pole 1314, and the rotor shaft 1308. A control current 1316 generates a control flux 1318. FIGS. 14A and 14B are a partial cross-sectional side view and a schematic cross-sectional top view, respectively, of an example heteropolar radial actuator 1400, which can provide active control of a rotor in a first radial direction parallel to the x-axis and a second radial direction parallel to the y-axis, resulting in radial forces acting on the rotor shaft in a location separate from a thrust bearing actuator (e.g., the example thrust actuator 1200 of FIG. 12). The example heteropolar radial actuator 1400 includes a laminated actuator stator 1402, control and bias coils 1404, a laminated actuator target 1406, a bias flux 1408, and a control flux 1410.

Figure 15:
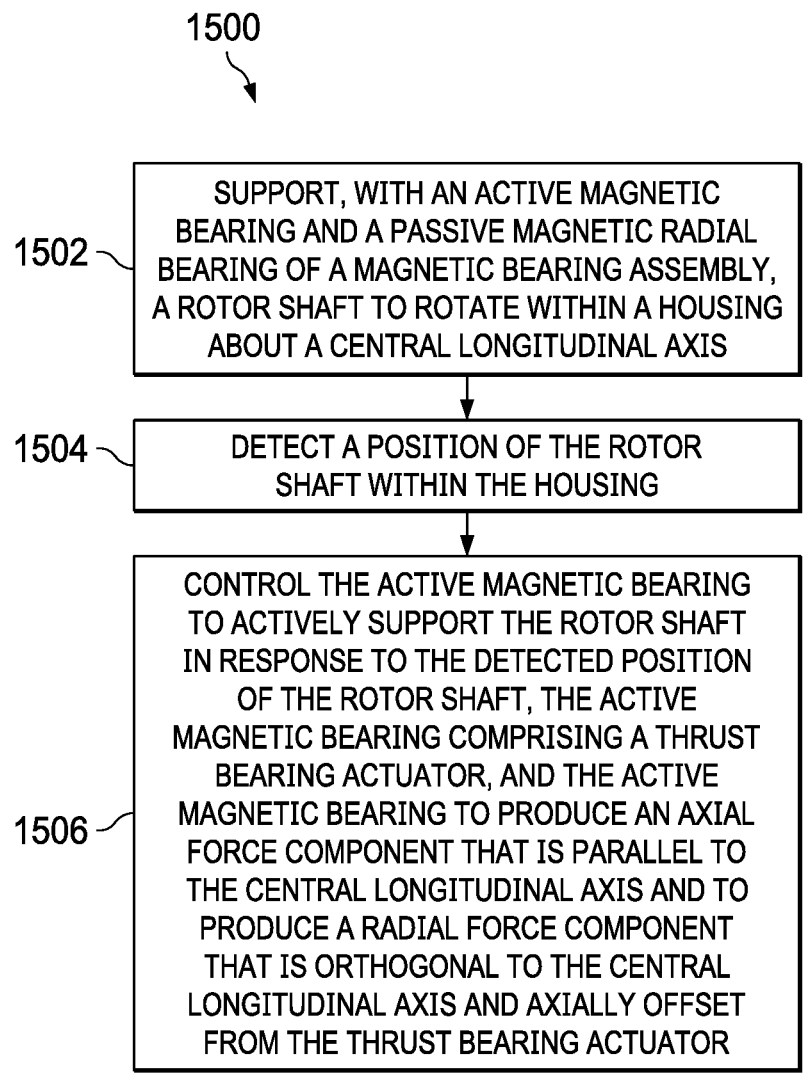
FIG. 15 is a flowchart describing an example method for supporting a rotor.

FIG. 15 is a flowchart describing an example method 1500 for supporting a rotor, for example, performed by an example magnetic bearing assembly of example rotor system 200, 300, or 800, or performed by one or more of the bearing actuators described in FIGS. 2-14B. At 1502, an active magnetic bearing and a passive magnetic radial bearing of a magnetic bearing assembly supports a rotor shaft to rotate within a housing about a central longitudinal axis. At 1504, a position of the rotor shaft within the housing is detected. At 1506, the active magnetic bearing is controlled to actively support the rotor shaft in response to the detected position of the rotor shaft. The active magnetic bearing includes a thrust bearing actuator, and produces an axial force component that is parallel to the central longitudinal axis and produces a radial force component that is orthogonal to the central longitudinal axis and axially offset from the thrust bearing actuator. In some implementations, the thrust bearing actuator includes three (or more) single-sided thrust actuators circumferentially disposed about a thrust disk of the rotor shaft, where controlling the active magnetic bearing include independently controlling axial forces of the three (or more) single-sided thrust actuators. The thrust actuators are separately controllable to provide the resultant magnetic force on the thrust disk. The resultant magnetic force includes at least one of the axial force component, a first rotational force component about a first radial axis, or a second rotational force component about a second radial axis orthogonal to the first radial axis. The single-sided thrust actuators are controlled to apply the resultant magnetic force, where the radial force component that is axially offset from the thrust bearing actuator is realized by the first rotational force component, the second rotational force component, or both the first and second rotational force components.

A number of implementations have been described. Nevertheless, it will be understood that various modifications may be made without departing from the spirit and scope of the disclosure.

What is claimed is:

1. A rotating machine, comprising:
   a housing,
   a rotor shaft configured to rotate about a central longitudinal axis within the housing;
   an impeller coupled to a longitudinal end of the rotor shaft;
   a position sensor to detect a position of the rotor shaft within the housing; and
   a magnetic bearing assembly coupled to the housing and configured to support the rotor shaft within the housing, the magnetic bearing assembly comprising:
      an active magnetic bearing configured to actively support the rotor shaft and comprising a thrust bearing actuator, the thrust bearing actuator comprising at least three thrust actuators circumferentially disposed about a thrust disk of the rotor shaft, the at least three thrust actuators configured to be controlled to produce different magnetic force and configured to provide a resultant magnetic force on the thrust disk, the active magnetic bearing to produce an axial force component that is parallel to the central longitudinal axis and to produce a radial force component that is orthogonal to the central longitudinal axis and axially offset from the at least three thrust actuators, where the resultant magnetic force includes the axial force component and the radial force component;
      a passive magnetic radial bearing to radially support the rotor shaft within the housing; and
      a controller electrically coupled to the active magnetic bearing to control a control current to the active magnetic bearing.

2. The rotating machine of claim 1, wherein the at least three thrust actuators are independently controllable.

3. The rotating machine of claim 2, wherein the at least three independently controllable thrust actuators are evenly distributed about a circumference of the thrust disk.

4. The rotating machine of claim 2, wherein the at least three independently controllable thrust actuators comprises four independently controllable thrust actuators evenly disposed about a circumference of the thrust disk.

5. The rotating machine of claim 2, wherein the independently controllable thrust actuators are single-sided actuators.

6. The rotating machine of claim 2, wherein the resultant magnetic force on the thrust disk comprises the axial force component and at least one of a first rotational force component about a first radial axis or a second rotational force component about a second radial axis orthogonal to the first radial axis, wherein at least one of the first rotational force component or the second rotational force component produce the radial force component that is axially offset from the at least three thrust actuators.

7. The rotating machine of claim 1, wherein the controller is configured to resolve for a position of the rotor shaft based at least partially on position data from the position sensor and direct corrective forces including the axial force component and the radial force component by the active magnetic bearing.

8. The rotating machine of claim 1, wherein the rotor shaft is oriented vertically.

9. The rotating machine of claim 1, wherein the impeller is formed in a compressor, blower, or fan.

10. The rotating machine of claim 1, wherein the active magnetic bearing comprises a homopolar permanent magnet combination radial and thrust bearing, or a homopolar permanent magnet side-by-side combination bearing having a thrust bearing component adjacent to a radial bearing component.

11. The rotating machine of claim 1, wherein the active magnetic bearing comprises an electromagnetic bias thrust actuator and a permanent magnet-bias homopolar radial magnetic bearing.

12. The rotating machine of claim 1, wherein the active magnetic bearing comprises an electromagnetic bias thrust actuator and a heteropolar radial actuator.

13. The rotating machine of claim 1, comprising two passive magnetic radial bearings disposed about the rotor shaft.

14. A method for supporting a rotor, the method comprising:
   supporting, with an active magnetic bearing and a passive magnetic radial bearing of a magnetic bearing assembly, a rotor shaft to rotate within a housing about a central longitudinal axis;
   detecting a position of the rotor shaft within the housing; and
   controlling the active magnetic bearing to actively support the rotor shaft in response to the detected position of the rotor shaft, the active magnetic bearing comprising a thrust bearing actuator, the thrust bearing actuator comprising at least three single-sided thrust actuators circumferentially disposed about a thrust disk of the rotor shaft, the at least three single-sided thrust actuators configured to be controlled to produce different magnetic force and configured to provide a resultant magnetic force on the thrust disk, and the active magnetic bearing to produce an axial force component that is parallel to the central longitudinal axis and to produce a radial force component that is orthogonal to the central longitudinal axis and axially offset from the three single-sided thrust actuators, where the resultant magnetic force includes the axial force component and the radial force component.

15. The method of claim 14, wherein controlling the active magnetic bearing comprises independently controlling axial forces of the at least three single-sided thrust actuators.

16. The method of claim 15, wherein the at least three single-sided thrust actuators are separately controllable, and controlling axial forces of the at least three single-sided thrust actuators comprises determining the resultant magnetic force on the thrust disk, the resultant magnetic force comprising the axial force component and at least one of a first rotational force component about a first radial axis or a second rotational force component about a second radial axis orthogonal to the first radial axis, and controlling the at least three single-sided thrust actuators to apply the resultant magnetic force, wherein at least one of the first rotational force component or the second rotational force component produce the radial force component that is axially offset from the at least three single-sided thrust actuators.

17. The method of claim 14, wherein controlling the active magnetic bearing to actively support the rotor shaft comprises resolving for the detected position of the rotor shaft and directing corrective forces including the axial force component and the radial force component by the active magnetic bearing.

18. The method of claim 14, wherein the rotor shaft is oriented vertically.

19. The method of claim 14, supporting the rotor shaft with the active magnetic bearing and a passive magnetic radial bearing comprises radially supporting the rotor shaft with two passive magnetic radial bearings disposed about the rotor shaft.

20. A magnetic bearing assembly, comprising:

an active magnetic bearing configured to actively support a rotor shaft in three degrees of freedom of the rotor shaft, the active magnetic bearing comprising a thrust bearing actuator, the thrust bearing actuator comprising at least three single-sided thrust actuators circumferentially disposed about a thrust disk of the rotor shaft and configured to produce an axial force component that is parallel to a central longitudinal axis of the rotor shaft and to produce a radial force component that is orthogonal to the central longitudinal axis and axially offset from the at least three single-sided thrust actuators, the at least three single-sided thrust actuators configured to be controlled to produce different forces and to provide a resultant magnetic force on the thrust disk, where the resultant magnetic force includes the axial force component and the radial force component;

a passive magnetic radial bearing to radially support the rotor shaft within a housing; and a controller electrically coupled to the active magnetic bearing to control a supply current to the active magnetic bearing.

21. The magnetic bearing assembly of claim 20, wherein the at least three single-sided thrust actuators are separately controllable to provide the resultant magnetic force on the thrust disk.

22. The magnetic bearing assembly of claim 21, wherein the resultant magnetic force on the thrust disk comprises the axial force component and at least one of a first rotational force component about a first radial axis or a second rotational force component about a second radial axis orthogonal to the first radial axis, wherein at least one of the first rotational force component or the second rotational force component produce the radial force component that is axially offset from the at least three single-sided thrust actuators.

* * * * *